(12) United States Patent
Caldwell et al.

(10) Patent No.: US 9,103,438 B2
(45) Date of Patent: Aug. 11, 2015

(54) METHOD AND APPARATUS FOR EXTRACTING ENERGY FROM A FLUCTUATING ENERGY FLOW FROM A RENEWABLE ENERGY SOURCE

(75) Inventors: Niall James Caldwell, Edinburgh (GB); Daniil Sergeevich Dumnov, Edinburgh (GB); Michael Richard Fielding, Linlithgow (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 754 days.

(21) Appl. No.: 13/380,136

(22) PCT Filed: May 30, 2011

(86) PCT No.: PCT/EP2011/058865
§ 371 (c)(1),
(2), (4) Date: Dec. 22, 2011

(87) PCT Pub. No.: WO2011/147996
PCT Pub. Date: Dec. 1, 2011

(65) Prior Publication Data
US 2012/0096844 A1  Apr. 26, 2012

(30) Foreign Application Priority Data
May 28, 2010 (GB) .................................. 1009013.2

(51) Int. Cl.
*F15B 13/00* (2006.01)
*F16H 61/4035* (2010.01)
(Continued)

(52) U.S. Cl.
CPC ............ *F16H 61/4035* (2013.01); *F03D 9/001* (2013.01); *F03D 11/02* (2013.01);
(Continued)

(58) Field of Classification Search
CPC ... F16H 39/02; F16H 61/4035; F16H 61/421; F16H 61/475; F16H 61/431; F03D 9/001; F05B 2260/406
USPC ....................................... 60/398; 91/476, 478
See application file for complete search history.

(56) References Cited

U.S. PATENT DOCUMENTS 4,280,061 A   7/1981   Lawson-Tancred
4,496,847 A   1/1985   Parkins
(Continued)

FOREIGN PATENT DOCUMENTS

EP   0361927   9/1989
EP   0494236   9/1990
(Continued)

OTHER PUBLICATIONS

Rampen W.H.S, Almond J.P, Taylor J.R.M, Ehsan Md. and Salter S.H, "Progress on the Development of the Wedding-cake Digital Hydraulic Pump/Motor", 2nd European Wave Power Conference, Lisbon, Nov. 8-10, 1995.
(Continued)

*Primary Examiner* — Dwayne J White
*Assistant Examiner* — Matthew Wiblin
(74) *Attorney, Agent, or Firm* — Lowe Hauptman & Ham,

(57) ABSTRACT

A hydraulic pump is driven by a rotating shaft, driven in turn by a renewable energy source. A hydraulic motor drives a load and a high pressure manifold communicates between the pump, motor and an elastically deformable fluid retaining body. The pressure in the high pressure manifold is measured and the net rate of displacement of working fluid by the hydraulic pump is selected responsive thereto to regulate the torque applied to the rotating shaft. The net rate of displacement of working fluid by the hydraulic motor is selected to smooth the energy flow to the load. The net rate of displacement of working fluid by the hydraulic motor is selected to regulate the pressure in the high pressure manifold to remain within an acceptable pressure range.

22 Claims, 9 Drawing Sheets

(51) Int. Cl.
*F03D 9/00* (2006.01)
*F03D 11/02* (2006.01)
*F16H 61/4148* (2010.01)
*F16H 61/421* (2010.01)
*F16H 61/431* (2010.01)
*F16H 61/475* (2010.01)
*F16H 39/02* (2006.01)

(52) U.S. Cl.
CPC .......... *F16H61/4148* (2013.01); *F16H 61/421* (2013.01); *F16H 61/431* (2013.01); *F16H 61/475* (2013.01); *F05B 2260/406* (2013.01); *F16H 39/02* (2013.01); *Y02E 10/28* (2013.01); *Y02E 10/722* (2013.01); *Y02E 10/725* (2013.01); *Y02E 60/17* (2013.01)

(56) References Cited

U.S. PATENT DOCUMENTS

| | | | |
|---|---|---|---|
| 4,503,673 | A | 3/1985 | Schachle |
| 5,145,324 | A | 9/1992 | Brekhus et al. |
| 7,485,979 | B1 | 2/2009 | Staalesen |
| 8,348,627 | B2 * | 1/2013 | Rampen et al. ................. 417/57 |
| 2009/0058095 | A1 | 3/2009 | McClintic |
| 2009/0145122 | A1 * | 6/2009 | Deeken et al. .................. 60/451 |
| 2009/0235655 | A1 * | 9/2009 | Koehler et al. ................. 60/445 |
| 2009/0317266 | A1 | 12/2009 | Rampen et al. |
| 2010/0040470 | A1 * | 2/2010 | Nies et al. ................. 416/170 R |
| 2012/0060685 | A1 | 3/2012 | Salter et al. |

FOREIGN PATENT DOCUMENTS

| | | | |
|---|---|---|---|
| EP | 1537333 | 6/2006 | |
| GB | 2463647 | 3/2010 | |
| JP | S56167873 | 12/1981 | |
| JP | 2005248738 | 9/2005 | |
| JP | 2006280020 | 10/2006 | |
| WO | 9105163 | 4/1991 | |
| WO | 2004025122 | 3/2004 | |
| WO | 2007053036 | 5/2007 | |
| WO | WO 2008012587 A2 * | 1/2008 | ................ F04B 1/06 |
| WO | 2008113699 | 9/2008 | |
| WO | 2009056140 | 5/2009 | |
| WO | 2010032012 | 3/2010 | |
| WO | 2010033035 | 3/2010 | |

OTHER PUBLICATIONS

Salter, S.H., "Proposal for a Large, Vertical-Axis Tidal-Stream Generator with Ring-Cam Hydraulics", Third European Wave Energy Conference, Sep. 30-Oct. 2, 1998, Patras Greece.

Rampen, W.H.S., Taylor, J.R.M., Riddoch, F., "Gearless transmissions for large wind turbines", Dewek, Bremen, 2006.

S.H. Salter, M. Rea. "Hydraulics for Wind", European Wind Energy Conference, Hamburg, Oct. 1984. W. Palz (Ed.), Bedford: H.S. Stephens, 1985, p. 534-541.

D.Q. Dang, "Nonlinear Model Predictive Control (NMPC) of Fixed Pitch Variable Speed Wind Turbine", ICSET 2008.

* cited by examiner

METHOD AND APPARATUS FOR EXTRACTING ENERGY FROM A FLUCTUATING ENERGY FLOW FROM A RENEWABLE ENERGY SOURCE

RELATED APPLICATIONS

The present application is a National Phase of International Application Number PCT/EP2011/058865, filed May 30, 2011 and claims priority from, British Application Number 1009013.2, filed May 28, 2010, the disclosure of which is hereby incorporated by reference herein in its entirety.

FIELD OF THE INVENTION

The invention relates to the field of methods and apparatus for extracting energy from a renewable energy source, such as wind or tidal energy, which provides a fluctuating energy flow.

BACKGROUND TO THE INVENTION

Renewable energy devices such as wind turbine generators (WTGs) and tidal stream generators are increasingly important sources of power for AC electricity networks. Such devices traditionally employ a transmission in the form of a gearbox to change the slow input speed of an energy extraction mechanism such as the rotor of a wind or tidal turbine into a fast output speed to drive a generator. Such gearboxes are challenging to design and build as they are prone to failure and expensive to maintain and replace or repair.

A further challenge in designing renewable energy devices is extracting the optimum amount of energy by the energy extraction mechanism in all conditions. The most effective devices achieve this by holding the blades at a fixed pitch angle, and varying the rotational speed of the blades proportionally to the wind or water speed over the majority of the operating range, so as to maintain a more or less constant 'tip speed ratio'. Gearboxes at the scale required for cost effective renewable energy devices are invariably fixed ratio, so complex and failure-prone electronic power conversion is required to provide electricity to an AC electricity network.

It has therefore been proposed to build transmissions for renewable energy devices using fluid working machines, it being possible to make such hydrostatic transmissions variable ratio even at large scales. Such a hydrostatic transmission is also lighter and more robust than a gearbox, and lighter than a direct generator drive, which would otherwise perform the same function, and thereby reduces the overall cost of producing electricity. U.S. Pat. No. 4,503,673 (Schacle) disclosed a plurality of variable displacement motors driven by a plurality of pumps, the motor displacement being varied in aggregate to control the hydraulic pressure according to a pressure vs. rotor speed function. WO 2007 053036A1 (Chapple) also disclosed a variable displacement motor driven by a fixed displacement pump, but with the motor displacement controlled according to the measured wind speed.

However, the input power to renewable energy devices is unpredictable from second to second, due to gusts and turbulence. This creates undesirable variations in the power output to the electricity network. For this reason it has been proposed to use a fluid store connected between the pump and motor, and to control the pump and/or motor to achieve the second-by-second storage and retrieval of excess energy in the fluid store.

It is known to provide a WTG comprising an electronically-commutated pump (i.e. one in which individual working chambers could be deactivated to vary the displacement of fluid by the pump each revolution, and thus the torque applied to the rotor). The rotor torque can be controlled to maintain a desired ratio of rotor speed to measured wind speed, while the turbine (functionally equivalent to the motor) or motor respectively can be controlled to maintain constant pressure in the fluid store (typically a pressure vessel or a flywheel or a vacuum store). U.S. Pat. No. 4,496,847 disclosed in addition constricting valves for, when necessary, isolating the pump from the turbine, thereby raising pressure to control the device against rotor overspeed. U.S. Pat. No. 4,280,061 (Lawson-Tancred) disclosed another WTG whereby the pump displacement was controlled according to the square of rotor speed and the motor was controlled to maintain constant pressure, in which the fluid store was a weighted hydraulic ram. U.S. Pat. No. 4,274,010 (Lawson-Tancred) disclosed in addition the ability to turn the generators/motors on and off intermittently according to power availability.

It is also known to provide a WTG with an electronically-commutated pump and a hydraulic accumulator as the energy store. While accumulators are a cheap and reliable energy store, their fluid pressure must vary very widely in operation. It is therefore not possible to apply the control strategies of other prior art (which control the pressure to set the torque on the rotor, or control the motors to maintain a predetermined pressure) to a WTG comprising accumulator energy storage, while maintaining the optimum tip speed ratio in order to extract the optimum amount of energy in all conditions.

An additional problem of hydrostatic WTGs of the prior art is that the efficiency of fluid working machines changes with operating pressure, and therefore energy may be unnecessarily lost when the control method dictates working at other than close to the optimum operating pressure.

The present invention aims to address one or more of the above problems and to provide a control method for a renewable energy device comprising a hydrostatic transmission and a cheap and reliable energy storage device, which is able to extract energy efficiently in all conditions, while providing a less variable energy output than would naturally occur.

SUMMARY OF THE INVENTION

According to a first aspect of the invention there is provided a method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and an elastically deformable fluid retaining body, the hydraulic pump and hydraulic motor each comprising a plurality of working chambers of cyclically varying volume and a plurality of valves for regulating the net displacement of working fluid between each working chamber and each manifold, at least one valve associated with each working chamber being an electronically controlled valve, said electronically controlled valves being operated to select the volume of working fluid displaced by each said working chamber on each cycle of working chamber volume and thereby regulate the net rate of displacement of working fluid by each of the hydraulic pump and the hydraulic motor, the method characterised by measuring the pressure in the high pressure manifold, selecting the net rate of displacement of working fluid by the hydraulic pump responsive to said measured pressure to regulate the torque applied to the said rotating shaft, selecting the net rate of displacement of working fluid by the hydraulic motor to smooth the energy flow to the load, and further selecting the net rate of displacement of working fluid by the hydraulic motor to regulate the pressure in the high pressure manifold to remain within an acceptable pressure range. The elastically deformable fluid retaining body receives and outputs the balance of working fluid, that is to say when the rate of output of working fluid by the hydraulic pump into the high pressure manifold is greater than the rate of receipt of working fluid from the high pressure manifold by the hydraulic motor it receives and stores working fluid, and when the rate of output of working fluid by the hydraulic pump into the high pressure manifold is less than the rate of receipt of working fluid from the high pressure manifold, it outputs stored working fluid.

The energy extraction device is typically a turbine, such as a wind turbine generator (WTG) or tidal stream generator, extracting energy from a renewable energy source, such as flow of air or water. The energy flow extracted typically fluctuates from one minute to the next, which without the benefit of the invention would cause the energy flow to the load to fluctuate. Renewable energy extraction devices that produce a relatively smooth energy output may be able to command a higher price for the energy they produce, or be more easily connected to energy grids, than those that provide a fluctuating output. The load is typically an electric generator but may be a pump, fan or compressor. Different loads may be connected at different times.

The elastically deformable fluid retaining body is typically a gas-charged oleo-pneumatic accumulator filled at one end with pressurised nitrogen or other gases, a length of rubber and steel hose or a fluid volume, or may be another device suitable for storing pressurised hydraulic fluid in which the pressure of the hydraulic fluid increases with increasing storage of hydraulic fluid by the device. Thus, the elastically deformable fluid retaining body may be an elastically deformable vessel (e.g. an elastically deformable fluid reservoir) or an elastically deformable conduit. As the fluid retaining body is elastically deformable it has a volume (within which fluid can be retained) which is variable and the said volume varies significantly with the pressure of the fluid retained within the elastically deformable fluid retaining body. The elastically deformable fluid retaining body may be located within a rigid body, such as a housing. There may be multiple elastically deformable fluid retaining bodies. Each may have different elastic properties. For example, where the elastically deformable fluid retaining bodies are accumulators, each may be filled with different gasses and/or different pressures. There may be multiple hydraulic pumps and/or multiple hydraulic motors. By the high pressure manifold and the low pressure manifold we refer to the relative working pressures within the manifolds and not to their absolute working pressures. The fluid pressure in the high pressure manifold is typically variable between 50 to 350 Bar greater than the fluid pressure in the low pressure manifold. The fluid pressure in the low pressure manifold is typically slightly higher than atmospheric pressure, for example 2 to 5 Bar, but may be approximately atmospheric pressure. Low pressure pumps and pressure relief valves may connect the low pressure manifold to a reservoir of working fluid, and there may be a low pressure elastically deformable fluid retaining body in fluid communication with the low pressure manifold.

By selecting the net rate of displacement of working fluid we refer to selecting the individual net displacements of one or more working chambers to fulfil a demanded net rate of displacement per unit of shaft rotation (said shaft being that shaft associated with the working chambers being selected), or selecting the number of working chambers making individual net displacements of fluid per unit of shaft rotation and the net displacements of those said working chambers. The net rate of displacement is thus independent of the shaft speed (unless the volume of fluid displaced is purposely selected responsive to said shaft speed). The net rate of displacement is typically an angle- or time-averaged sum of the individual net displacements of one or more selected working chambers such that the angle- or time-averaged sum over a short period of time converges towards the demanded net rate of displacement.

By selecting the net displacement of working fluid we refer to actively controlling at least one electronically controlled valve associated with a working chamber, synchronised with individual cycles of working chamber volume, to cause a selected net displacement of a volume of fluid into or out of the high pressure manifold. Fluid flow can occur which does not lead to net displacement. For example, in an idle cycle flow may flow out of a working chamber and the same volume may flow back into the working chamber with no net displacement.

Preferably the net displacement of working fluid is selected on a cycle-by-cycle basis for each individual working chamber, such that all the working chambers operating together fulfil a demanded net rate of displacement which can be achieved by the displacement of fluid. Preferably the demanded net rate of displacement for the working chambers of the pump determines the net torque applied to the rotating shaft. Preferably the demanded net rate of displacement of the working chambers of the motor is proportional to the net torque or power applied to the load, or the rate of displacement of fluid from the high pressure manifold.

By regulating the torque we refer to selecting the net rate of displacement of working fluid by the hydraulic pump according to a torque demand function, which may be a function of one or more measured parameters of the renewable energy source or the energy extraction device. It may be that the torque demand function is a function of the speed of the rotating shaft or the power of the fluctuating energy flow. The torque demand function may specify the time-averaged net torque applied to the rotating shaft by the plurality of working chambers of the pump. Preferably the net rate of displacement of working fluid by the hydraulic pump is selected responsive to the torque demand function, the one or more measured parameters, and the measured pressure. Preferably the net displacement of working fluid is selected on a cycle-by-cycle basis for each individual working chamber, such that the time-averaged net torque applied to the rotating shaft by the active working chambers of the pump fulfils the torque demand function. Preferably the torque applied to the rotating shaft by the working chambers is selected on a cycle-by-cycle basis by actively controlling at least one electronically controlled valve associated with a working chamber to cause the pressurisation of said working chamber and the transference by the working chamber of torque to the rotating shaft synchronised with individual cycles of working chamber volume.

By regulating the pressure in the high pressure manifold we refer to selecting the net rate of displacement of working fluid by the hydraulic pump or by the hydraulic motor relative to the net rate of displacement of working fluid by the other of the hydraulic pump or hydraulic motor, to increase or decrease the amount of fluid stored in the elastically deformable fluid retaining body and thereby increase or decrease respectively the pressure of the working fluid in the high pressure manifold towards a target pressure or range of pressures. It may be that the pressure in the high pressure manifold is regulated by selecting the difference between the net rate of displacement demand of the hydraulic pump and the hydraulic motor to increase or decrease the amount of fluid stored in the elastically deformable fluid retaining body and thereby move the pressure of the working fluid in the high pressure manifold towards a target pressure. It may be that the pressure in the high pressure manifold is regulated by changing the rate of displacement of the working fluid into or out of the high pressure manifold by the hydraulic pump or hydraulic motor, while not substantially changing the rate of displacement of a fluid into or out of the high pressure manifold by the other of the hydraulic pump or hydraulic motor, and thereby changing the volume of fluid stored in the elastically deformable fluid retaining body, to control the volume of fluid stored in the elastically deformable fluid retaining body towards a desired volume.

Preferably the acceptable pressure range comprises a first range and a second range, or ranges, either higher or lower than the first range, or both higher and lower than the first range, and the pressure within the high pressure manifold is regulated more strongly when the pressure is within the or each second range. Preferably the second range comprises a lower second range which is below the first range. Preferably the lower second range extends from zero pressure to the lower limit of the first range. Preferably the second range comprises an upper second range which is above the first range. Preferably the upper second range extends from the upper limit of the first range to beyond the maximum pressure seen in use. It may be that the extents of the acceptable pressure range, first range, second range, lower second range and/or upper second range are variable.

The pressure may be regulated more strongly in the or each second range than in the first range by virtue of the net rate of displacement of working fluid by the hydraulic motor being varied, to change the pressure in the high pressure manifold, by a larger amount responsive to a change in pressure in the or each second range than it is varied due to the same magnitude of pressure change in the first range. The larger amount may be 2, 5 or 10 times larger. The gain of the pressure regulation may be higher in the second range than in the first range, for example by the larger amount. It may be that the net rate of displacement of working fluid by the hydraulic motor is selected dependent on the pressure within the high pressure manifold and the selected net rate of displacement of working fluid by the hydraulic motor changes by a greater amount for a given change in pressure within the high pressure manifold in the second range than in the first range.

Preferably the strength of the pressure regulation increases progressively as the pressure moves further into the second range. It may be that the gain of the pressure regulation increases progressively as the pressure moves further into the second range.

Preferably the pressure within the high pressure manifold is substantially unregulated when the pressure is within the first range. For example, it may be that the net rate of displacement of working fluid by the hydraulic motor is changed by no more than 20%, 10%, 5% or 1% at any pressure in the first range compared to any other pressure in the first range. It may be that the net rate of displacement of working fluid by the hydraulic motor is changed only so much that when the fluctuating energy flow is not fluctuating, i.e. it is smooth, the pressure within the high pressure manifold takes longer than 1 minute, 2 minutes, 5 minutes or 10 minutes to converge to within 5% of a target pressure, or range of pressures, from a pressure at the upper or lower edge of the first range.

It may be that when the pressure within the high pressure manifold is within the first range, the net rate of displacement of working fluid by the motor is selected without regard to the effect of that rate on the pressure within the high pressure manifold. It may be that when the pressure within the high pressure manifold is within the first range, the net rate of displacement of working fluid by the motor is selected independently, or substantially independently, of the pressure within the high pressure manifold.

Preferably the pressure in the high pressure manifold is regulated towards a target (typically optimum) pressure, or range of pressures. The target pressure, or range of pressure, may be the first range, a subset of the first range, or a specific pressure within the first range. Preferably the pressure is regulated towards the target pressure, or target range of pressures, when the pressure is within the first range. Preferably the pressure is regulated towards the target pressure, or target range of pressures, when the pressure is within the or each second range.

Preferably the pressure within the high pressure manifold is regulated towards the target pressure, or target range of pressures, more strongly when the pressure within the high pressure manifold is within the or each second range than within the first range.

Preferably the target pressure, or range of pressures, is variable. The target pressure, or range of pressures, may be changed continuously, or it may be changed periodically, for example every minute, every hour, every day or every month. The target pressure, or range of pressures, may be changed automatically, for example, responsive to a calculation carried out responsive to an event, or manually, for example, responsive to a user input through a user interface.

The method may comprise selecting a target pressure, or range of pressures, within the high pressure manifold responsive to one or more characteristics of the fluctuating energy flow, the hydraulic pump, the hydraulic motor, the elastically deformable fluid retaining body, or the load, or any combination thereof. The target pressure may be a target pressure function of one or more operating variables, for example one or more characteristics of the fluctuating energy flow.

Preferably the target pressure or range of pressures is changed in anticipation of energy being received from the fluctuating energy source at a rate exceeding a threshold or to cause the pressure within the high pressure manifold to extravagate a threshold. Preferably the target pressure or range of pressures is reduced in anticipation of energy being received from the fluctuating energy source at a rate exceeding a threshold or to cause the pressure within the high pressure manifold to exceed a threshold. The reduction may occur shortly before (for example, less than one minute before) or a long time before (for example over an hour before) the energy is received from the fluctuating energy source at a rate exceeding a threshold or at a rate that would cause the pressure within the high pressure manifold to exceed a threshold. The reduction may be achieved by selecting the net rate of displacement of working fluid by the hydraulic motor.

Preferably the acceptable pressure range is variable. It may be that the acceptable pressure range is a function of one or more operating variables, for example one or more characteristics of the fluctuating energy flow. The one or more characteristics of the fluctuating energy flow may include the average, the peakiness, the gustiness or the peak-to-peak range of the fluctuating energy flow. The acceptable pressure range may be changed automatically, for example, responsive to a calculation, or manually, for example, responsive to a user input through a user interface.

Preferably when the pressure exceeds a (fixed or variable) threshold, action is taken to reduce the torque transmitted to the hydraulic pump through the rotating shaft. Preferably when the pressure exceeds the threshold the renewable energy source is controlled to reduce the torque transmitted to the rotating shaft by the renewable energy source. Preferably when the pressure exceeds a (fixed or variable) threshold, the net rate of displacement of working fluid by the hydraulic pump is reduced. Preferably when the pressure exceeds a (fixed or variable) threshold, the method comprises reconfiguring the energy extraction device to extract less energy from the fluctuating energy source. Where the energy extraction device is a turbine, reconfiguring the energy extraction device may comprise one or more of changing the pitch of the blades, feathering the blades, applying a mechanical brake or applying a hydraulic brake, to cause the turbine to extract less energy from the fluctuating energy source.

Preferably the torque applied to the rotating shaft by the hydraulic pump is regulated according to a function comprising one or more of the current rotation rate of the rotating shaft and the rate of change of the rotation rate of the rotating shaft. Preferably the torque applied to the rotating shaft by the hydraulic pump is regulated in at least one constant tip speed ratio range substantially according to a function of the square of the rotational speed of the rotating shaft. It may be that, especially when the fluctuating energy flow changes, the torque applied to the rotating shaft by the hydraulic pump is adjusted by a function of the error between the aerodynamically optimal torque applied to the shaft at the current rotation rate and the optimal torque applied to the shaft at the actual conditions of the fluctuating energy flow. It may be that the torque applied to the rotating shaft by the hydraulic pump is adjusted by a function of the rate of change of the rotation rate of the rotating shaft. Preferably the pitch of the blades is constant in the constant tip speed ratio range.

Preferably the acceptable pressure range is varied according to a function comprising one or more of the current rotation rate of the rotating shaft, or the characteristics of the fluctuating energy flow. Preferably the acceptable pressure range is varied according to a function of the square of the rotational speed of the rotating shaft. Preferably the acceptable pressure range is varied according to a function of the one or more characteristics of the fluctuating energy flow.

It may be that the operation of said electronically controlled valves is adjusted to compensate for one or more of compression or leakage of the working fluid or energy losses caused by flow of the working fluid. Preferably the volume selected for displacement by each working chamber is adjusted to compensate for one or more of compression or leakage of the working fluid caused by fluid pressure or energy losses caused by flow of the working fluid. Preferably the rate of operation of each or several working chambers is adjusted to compensate for one or more of compression or leakage of the working fluid caused by fluid pressure or energy losses caused by flow of the working fluid.

Preferably the method comprises executing a smoothing calculation. Preferably the smoothing calculation comprises the steps of calculating the energy extracted from the fluctuating flow by the energy extraction device, calculating a smoothed version thereof, and selecting the net rate of displacement of working fluid by the hydraulic motor responsive to said smoothed version. Preferably the net rate of displacement of working fluid by the hydraulic motor is selected to provide to the load an energy flow equal to said smoothed version. It may be that the smoothing calculation comprises the steps of calculating the difference between the target pressure and the measured pressure, applying a smoothing function to said difference, and selecting the net rate of displacement of working fluid by the hydraulic motor responsive to the output of said smoothed function. Preferably the smoothing function includes one or more of an integrator, a low pass filter and a slew rate.

The net rate of displacement of working fluid by the motor is regulated to smooth the energy transmitted to the load so that it more nearly matches an average flow of the fluctuating energy flowing from the renewable energy source. Thus, the energy transmitted to the load fluctuates less than the fluctuating energy flow.

The fluctuating energy flow may have a peak flow that exceeds 20%, 40% or 50% above the average flow in at least one averaging period. The fluctuating energy flow may have a minimum flow below 20%, 40% or 50% less than the average flow in at least one averaging period.

Preferably, the smoothed energy flow to the load is steady. Preferably the smoothed energy flow has a peak flow that does not exceed 5%, 10% or 20% above the average flow in at least one averaging period. Preferably a steady energy flow is one having a minimum flow not below 5%, 10% or 20% less than the average flow in at least one averaging period.

Preferably the smoothed energy flow has a maximum relative rate of change which does not exceed one third, one fifth or one tenth of the maximum relative rate of change of a corresponding fluctuating energy flow over the same averaging period. A maximum relative rate of change of a flow is the largest instantaneous rate of change over time, relative to the average of that flow.

Preferably the smoothed energy flow has a deviation from its average of no more than one third, one fifth or one tenth of the deviation of the fluctuating energy flow from its own average.

Preferably the said averaging periods are less than 10 minutes, for example, 5 minutes, but may be less than 30 minutes, one hour, or one day. Preferably the average flow over an averaging period is substantially the same as the average flow over the same averaging period of a corresponding fluctuating energy flow relating thereto (e.g. a steady energy flow derived from, driven by, caused by or absorbing the corresponding fluctuating energy flow.)

The energy extraction device preferably comprises a controller for actively controlling the electronically controlled valves in phased relationship to cycles of working chamber volume, to regulate the net rate of displacement of working fluid displaced by each working chamber. The controller may comprise a processor, or a plurality of processors, which may be distributed.

Preferably the hydraulic pump and the hydraulic motor each comprise a rotatable shaft for cyclically driving or being cyclically driven by the working chambers. Preferably the shaft is an eccentric camshaft, and the shaft may comprise a ring cam. The hydraulic pump may function only as a pump and the hydraulic motor may function only as a motor. Alternatively, the hydraulic pump or hydraulic motor may function as either a motor or a pump in alternative operating modes.

Preferably, each working chamber is operable on each cycle of working chamber volume to carry out an active cycle in which the chamber makes a net displacement of working fluid or an idle cycle in which the chamber makes substantially no net displacement of working fluid. It may be that each working chamber is operable to displace one of a plurality of volumes of working fluid (for example, a range of volumes of working fluid) during an active cycle. The said range of volumes may be discontinuous, for example, the range of volumes of working fluid may comprise a range extending from a first minimum of substantially no net fluid displacement, to a first maximum of at most 25% or 40% of the maximum net fluid displacement of a working chamber, and then from a second minimum of at least 60% or 75% of the maximum net fluid displacement of a working chamber, to a second maximum in the region of 100% of the maximum net fluid displacement of a working chamber. This may occur where, for example, the operating working fluid pressure is sufficiently high that it is not possible to open or close valves in the middle of expansion or contraction strokes of working chamber volume, or the fluid flow is sufficiently high that operating with a continuous range of volumes would be damaging to the working chamber, the valves of the working chamber, or other parts of each fluid working machine.

By "actively control" we refer to enabling the controller to affect the state of a valve, in at least some circumstances, by a control mechanism which consumes power and is not exclusively a passive response, for example, the opening or closing of a valve responsive solely to the pressure difference across a valve. Related terms such as "active control" should be construed accordingly. Nevertheless, the valves are preferably also operable to open or close by passive means. The valve typically opens passively due to the drop in pressure within the working chamber, such as during an intake stroke. For example, the valve may, during at least some cycles, open passively due to a pressure difference and be selectively closable and/or openable under the active control of the controller during a portion of the cycle. Preferably the valves are also biased open or biased closed by a biasing means. Preferably the valves are moveable from a first position to a second position under active control, and movable from the second position to the first position by the biasing means. Preferably one of the first or second positions is a closed position, and the other is an opened position.

By "actively control" (and related terms such as "active control") we include the possibilities that the controller is operable to selectively cause a valve to do one or more of open, close, remain open and/or remain closed. The controller may only be able to affect the state of a valve during a portion of a working cycle. For example, the controller may be unable to open the low pressure valve against a pressure difference during the majority of a working cycle when pressure within the working chamber is substantial. Typically, the controller actively controls the valves by transmitting a control signal either directly to a valve or to a valve driver, such as a semiconductor switch. By transmitting a control signal, we include transmitting a signal which denotes the intended state of a valve (e.g. open or closed) or a pulse which denotes that the state of a valve should be changed (e.g. that the valve should be opened or closed), or a pulse which denotes that the state of a valve should be maintained. The controller may transmit a signal on a continuous basis and stop or change the signal to cause a change in the state of a valve. Valves may comprise a normally closed solenoid opened valve which is held open by provision of an electric current and actively closed by switching off the current.

By "in phased relationship to cycles of working chamber volume" we mean that the timing of active control by the controller of the valves is determined with reference to the phase of the volume cycles of the working chamber. Accordingly, each fluid working machine typically comprises working chamber phase determining means, such as a position sensor. For example, where the cycles of working chamber volume are mechanically linked to the rotation of a shaft, each fluid working machine preferably comprises a shaft position sensor, and optionally a shaft speed sensor, and the controller is operable to receive a shaft position signal from the shaft position sensor, and optionally a shaft speed signal from a said shaft speed sensor. In embodiments which comprise a plurality of working chambers, with a phase difference between the volume cycles of different working chambers, the controller will typically be operable to determine the phase of individual working chambers.

Preferably, when the selected net rate of displacement of fluid by the working chambers of the hydraulic pump or the hydraulic motor is sufficiently low, one or more working chambers operable to displace fluid is redundant during one or more cycles of working chamber volume, that is to say, if the working chamber was not present or was not operating, the hydraulic pump or hydraulic motor machine could anyway displace sufficient fluid to meet the demand without changing the overall frequency of active cycles of working chamber volume. Preferably, when the selected net displacement of fluid by the working chambers of the hydraulic pump or the hydraulic motor is sufficiently low, the selected volume of fluid displaced by at least one of the working chambers which are available to provide the selected displacement is substantially zero for at least some cycles of working chamber volume. In some embodiments, when the selected net displacement of fluid by the working chambers of the hydraulic pump or the hydraulic motor is sufficiently low, at least one of the working chambers which are available to provide the selected displacement carries out an idle cycle for at least some cycles of working chamber volume. In some embodiments, wherein the working chambers are operable to displace one of a plurality of volumes of working fluid, when the selected net displacement of fluid by the working chambers of the hydraulic pump or the hydraulic motor is sufficiently low, the selected volume of fluid displaced by at least one of the working chambers which are available to is less than the maximum volume of working fluid which the said at least one of the working chambers is operable to displace.

According to a second aspect of the invention there is provided a method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and a elastically deformable fluid retaining body, the hydraulic pump and hydraulic motor each comprising a plurality of working chambers of cyclically varying volume and a plurality of valves for regulating the net rate of displacement of working fluid between each working chamber and each manifold, at least one valve associated with each working chamber being an electronically controlled valve, said electronically controlled valves being operated to select the volume of working fluid displaced by each said working chamber on each cycle of working chamber volume and thereby regulate the net rate of displacement of working fluid by each of the hydraulic pump and the hydraulic motor, the method characterised by selecting the net rate of displacement of working fluid by the hydraulic pump to regulate the torque applied by the hydraulic pump to the said rotating shaft, selecting the net rate of displacement of working fluid by the hydraulic motor to smooth the rate of power transmission to the load, the elastically deformable fluid retaining body receiving and outputting working fluid from and to the high pressure manifold as required, and regulating the pressure in the high pressure manifold to remain within an acceptable pressure range.

According to a third aspect of the invention there is provided a method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and an elastically deformable fluid retaining body, the hydraulic pump and hydraulic motor each comprising a plurality of working chambers of cyclically varying volume and a plurality of valves for regulating the net rate of displacement of working fluid between each working chamber and each manifold, at least one valve associated with each working chamber being an electronically controlled valve, said electronically controlled valves being operated to select the volume of working fluid displaced by each said working chamber on each cycle of working chamber volume and thereby regulate the net rate of displacement of working fluid by each of the hydraulic pump and the hydraulic motor, the method characterised by selecting the net rate of displacement of working fluid by the hydraulic pump to regulate the torque applied to the said rotating shaft, selecting the net rate of displacement of working fluid by the hydraulic motor to provide a steady energy flow to the load, the elastically deformable fluid retaining body receiving and outputting working fluid equivalent to the difference between the fluctuating energy flow and the steady energy flow from and to the high pressure manifold as required, and selecting the net rate of displacement of working fluid by the hydraulic motor to regulate the pressure in the high pressure manifold to remain within an acceptable pressure range.

According to a fourth aspect of the invention there is provided a method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and an elastically deformable fluid retaining body, the hydraulic pump and hydraulic motor each comprising a plurality of working chambers of cyclically varying volume and a plurality of valves for regulating the net rate of displacement of working fluid between each working chamber and each manifold, at least one valve associated with each working chamber being an electronically controlled valve, said electronically controlled valves being operated to select the volume of working fluid displaced by each said working chamber on each cycle of working chamber volume and thereby regulate the net rate of displacement of working fluid by each of the hydraulic pump and the hydraulic motor, the method characterised by measuring the pressure in the high pressure manifold, selecting the net rate of displacement of working fluid by the hydraulic pump responsive to said measured pressure to regulate the torque applied to the said rotating shaft, the elastically deformable fluid retaining body receiving and outputting working fluid equivalent to the difference between the fluctuating energy flow and the energy flow through the hydraulic motor from and to the high pressure manifold as required, and in a first pressure range selecting the net rate of displacement of working fluid by the hydraulic motor responsive to said measured pressure to provide a smoothed energy flow to the load, and in at least one second pressure range selecting the net rate of displacement of working fluid by the hydraulic motor responsive to said measured pressure to regulate the pressure towards the first pressure range.

According to a fifth aspect of the invention there is provided a method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and an elastically deformable fluid retaining body, the hydraulic pump and hydraulic motor each comprising a plurality of working chambers of cyclically varying volume and a plurality of valves for regulating the net rate of displacement of working fluid between each working chamber and each manifold, at least one valve associated with each working chamber being an electronically controlled valve, said electronically controlled valves being operated to select the volume of working fluid displaced by each said working chamber on each cycle of working chamber volume and thereby regulate the net rate of displacement of working fluid by each of the hydraulic pump and the hydraulic motor, the method characterised by measuring the pressure in the high pressure manifold, selecting the net rate of displacement of working fluid by the hydraulic pump responsive to said measured pressure to regulate the torque applied to the said rotating shaft, executing a first priority behaviour in which the net rate of displacement of working fluid by the hydraulic motor is selected to maintain said measured pressure within an acceptable pressure range, and executing a second priority behaviour in which the net rate of displacement of working fluid by the hydraulic motor is selected responsive to said measured pressure to provide a steady energy flow to the load.

It may be that the first and second priority behaviours are executed at different times. It may be that both the first and second priority behaviours are executed concurrently, with a variable balance between the first priority behaviour and the second priority behaviour.

Preferably the acceptable pressure range comprises a first range and a second range, or ranges, either higher or lower than the first range, and the second priority behaviour is executed only when, or more strongly when, the measured pressure is within the first pressure range than when it is in the second range or ranges. Preferably the first priority behaviour is executed, or executed more strongly, and the second priority behaviour is not executed, or executed less strongly, when the measured pressure is within the or each second pressure range, than when it is within the first pressure range.

It may be that the method comprises executing a third priority behaviour in which the net rate of displacement of working fluid by the hydraulic motor is selected to regulate said measured pressure towards a target (typically optimum) pressure, or range of pressures.

Preferably the third priority behaviour is executed only when, or more strongly when, the measured pressure is within the first pressure range than when it is within the second range or ranges.

According to a sixth aspect of the present invention there is provided a method of operating an energy extraction device to extract energy from a fluctuating energy flow from a renewable energy source, the device comprising: a hydraulic pump driven by a rotating shaft, the rotating shaft driven by the renewable energy source, a hydraulic motor driving a load, at least one low pressure manifold, and a high pressure manifold in fluid communication with an outlet of the hydraulic pump and an inlet of the hydraulic motor, the hydraulic pump and hydraulic motor each comprising a plurality of working chambers of cyclically varying volume and a plurality of valves for regulating the net rate of displacement of working fluid between each working chamber and each manifold, at least one valve associated with each working chamber being an electronically controlled valve, said electronically controlled valves being operated to select the volume of working fluid displaced by each said working chamber on each cycle of working chamber volume and thereby regulate the net rate of displacement of working fluid by each of the hydraulic pump and the hydraulic motor, the method characterised by measuring the pressure in the high pressure manifold, selecting the net rate of displacement of working fluid by the hydraulic pump responsive to said measured pressure to regulate the torque applied to the said rotating shaft, and selecting the net rate of displacement of working fluid by at least the hydraulic motor to cause the pressure within the high pressure manifold to tend towards an optimum wherein the optimum is variable.

Preferably, an energy extraction device controlled according to the method of the sixth aspect of the invention includes an elastically deformable fluid retaining body in fluid communication with the high pressure manifold.

The optimum may be an optimum pressure or an optimum range of pressures. Typically, the optimum (pressure or range of pressures) is varied responsive to one or more measured properties of the fluctuating energy flow. However, the optimum (pressure or range of pressures) may be varied responsive to one or more measured properties of the renewable energy source.

The optimum (pressure or range of pressures) may be varied taking into account one or more properties of the hydraulic pump, the hydraulic motor, the elastically deformable fluid retaining body or the load.

The method may comprise predicting a future property of the fluctuating energy flow or the renewable energy source and varying the optimum (pressure or range of pressures) responsive to the predicted future property. This may comprise making one or more measurements of the fluctuating energy flow, or of the renewable energy source, or of the received energy.

The optimum (pressure or range of pressures) is typically selected to optimise the efficiency of power transmission from the rotating shaft to the load. The optimum (pressure or range of pressures) may be selected to optimise the longevity of the energy extraction device. Preferably the optimum (pressure or range of pressures) increases from a minimum pressure (or a minimum of the lower end of a range of pressures) at a low rate of extraction of energy from the fluctuating energy flow to a maximum pressure (or a maximum of the upper end of a range of pressures) at a high rate of extraction of energy from the fluctuating energy flow. It may be that the minimum pressure (or the lower end of a range of pressures) is not zero. It may be that minimum pressure (or the lower end of a range of pressures) is at least equal to, or it may be that minimum pressure (or the lower end of a range of pressures) is greater than, the low pressure manifold pressure.

It may be that, for at least a range of pressures, the optimum (pressure or range of pressures) is independent of the torque applied to the rotating shaft by the pump.

Preferably, the optimum (pressure or range of pressures) is controlled dependent on one or more factors (for example, the one or more measured properties of the fluctuating energy flow and/or the one or more measured properties of the renewable energy source) and the temperature of the working fluid is controlled dependent on some or all of the same factors. It may be that the temperature of the working fluid is controlled dependent on the selected optimum (pressure or range of pressures). Preferably the temperature of the working fluid is controlled to be higher when the selected optimum (pressure or range of pressures) is low, and lower when the selected optimum (pressure or range of pressures) is high.

According to a seventh aspect of the present invention there is provided an energy extraction device for extracting energy from a fluctuating energy flow from a renewable energy source, the device comprising: a controller, a hydraulic pump driven by a rotating shaft, the rotating shaft driven by a renewable energy source, a hydraulic motor driving a load, at least one low pressure manifold, a high pressure manifold in fluid communication with an outlet of the hydraulic pump, an inlet of the hydraulic motor, an elastically deformable fluid retaining body, and a pressure sensor for measuring the pressure in the high pressure manifold, the hydraulic pump and hydraulic motor each comprising a plurality of working chambers of cyclically varying volume and a plurality of valves for regulating the net displacement of working fluid between each working chamber and each manifold, at least one valve associated with each working chamber being an electronically controlled valve, said electronically controlled valves being controllable by the controller to select the volume of working fluid displaced by each said working chamber on each cycle of working chamber volume and thereby regulate the net rate of displacement of working fluid by each of the hydraulic pump and the hydraulic motor, wherein the controller is operable to cause the energy extraction device to operate according to the method of any one of the first six aspects of the invention.

The controller may comprise a processor (e.g. microprocessor or microcontroller) or a plurality of processors (which may be distributed). Typically the or each processor is in electronic communication with a computer readable storage medium storing a program which is executed in use thereby causing the controller to operate the energy extraction device according to the method of any one of the first six aspects of the invention.

Accordingly, the invention extends in an eighth aspect to a computer readable storage medium comprising program code instructions which, when executed by the controller of an energy extraction machine according to the seventh aspect of the invention, cause the energy extraction machine to carry out the method of any one of the first through sixth aspects of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
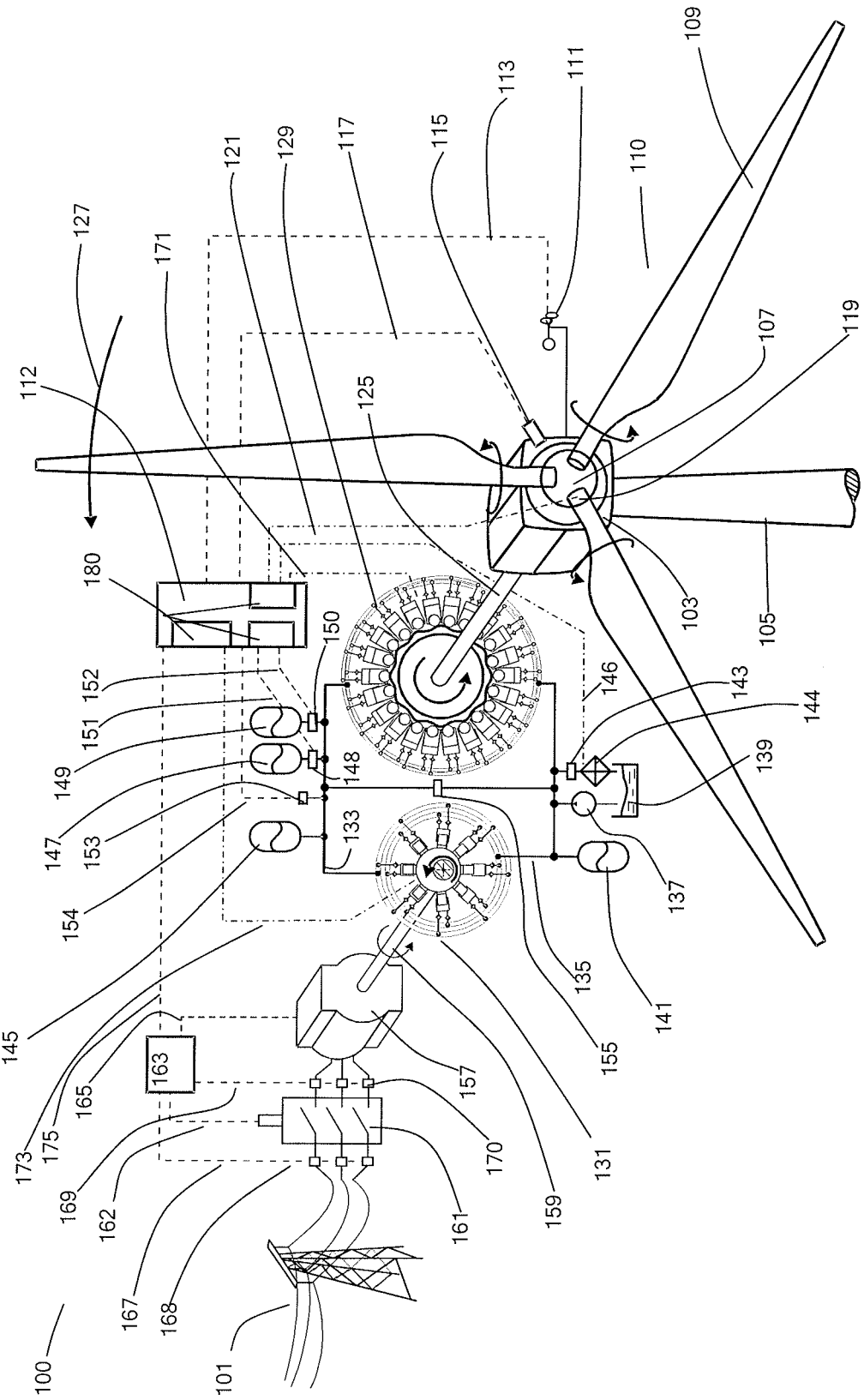
FIG. 1 shows the a wind turbine generator connected to an electricity network and implementing the invention.

FIG. 1 illustrates an example embodiment of the invention in the form of a Wind Turbine Generator (WTG, 100), acting as the energy extraction device, and connected to an electricity network (101). The WTG comprises a nacelle (103) rotatably mounted to a tower (105) and having mounted thereon a hub (107) supporting three blades (109) known collectively as the rotor (110). An anemometer (111) attached externally to the nacelle provides a measured wind speed signal (113) to a controller (112). A rotor speed sensor (115) at the nacelle provides the controller with a rotor speed signal (117, acting as the current rotation rate of the rotating shaft). In the example system the angle of attack of each of the blades to the wind can be varied by a pitch actuator (119), which exchanges pitch actuation signals and pitch sensing signals (121) with the controller. The invention could be applied to a WTG without a pitch actuator.

The hub is connected directly to a pump (129), through a rotor shaft (125), acting as the rotatable shaft, which rotates in the direction of rotor rotation (127). The pump is preferably of the type described with reference to FIG. 3, and has a fluid connection to a hydraulic motor (131), preferably of the type described with reference to FIG. 2. The fluid connection between the pump and the hydraulic motor is through a high pressure manifold (133) and a low pressure manifold (135), connected to their high pressure port and low pressure port respectively, and is direct in the sense that there are no intervening valves to restrict the flow. The pump and hydraulic motor are preferably mounted directly one to the other so that the high pressure manifold and low pressure manifold are formed between and within them. A charge pump (137) continuously draws fluid from a reservoir (139) into the low pressure manifold, which is connected to a low pressure accumulator (141). A low pressure relief valve (143) returns fluid from the low pressure manifold to the reservoir through a heat exchanger (144) which is operable to influence the temperature of the working fluid and is controllable by the controller via a heat exchanger control line (146). A smoothing accumulator (145) is connected to the high pressure manifold between the pump and the hydraulic motor. A first high pressure accumulator (147) and a second high pressure accumulator (149) (together acting as the elastically deformable fluid retaining body) are connected to the high pressure manifold through a first isolating valve (148) and a second isolating valve (150) respectively. The first and second high pressure accumulators may have different precharge pressures, and there may be additional high pressure accumulators with an even wider spread of precharge pressures. The states of the first and second isolating valves are set by the controller through first (151) and second (152) isolating valve signals respectively. Fluid pressure in the high pressure manifold is measured with a pressure sensor (153), which provides the controller with a high pressure manifold pressure signal (154). The pressure sensor may optionally also measure the fluid temperature and provide a fluid temperature signal to the controller. A high pressure relief valve (155) connects the high pressure and low pressure manifolds.

The hydraulic motor is connected to a generator (157), acting as the load, through a generator shaft (159). The generator is connected to an electricity network through a contactor (161), which receives a contactor control signal (162) from a generator and contactor controller (163) and is operable to selectively connect the generator to or isolate the generator from the electricity network. The generator and contactor controller receives measurements of voltage, current and frequency from electricity supply signals (167) and generator output signals (169), measured by electricity supply sensors (168) and generator output sensors (170) respectively, communicates them to the controller (112) and controls the output of the generator by adjusting field voltage generator control signals (165) in accordance with generator and contactor control signals (175) from the controller.

The pump and motor report the instantaneous angular position and speed of rotation of their respective shafts, and the temperature and pressure of the hydraulic oil, to the controller, and the controller sets the state of their respective valves, via pump actuation signals and pump shaft signals (171) and motor actuation signals and motor shaft signals (173). The controller uses power amplifiers (180) to amplify the pitch actuation signals, the isolating valve signals, the pump actuation signals and the motor actuation signals.

Figure 2:
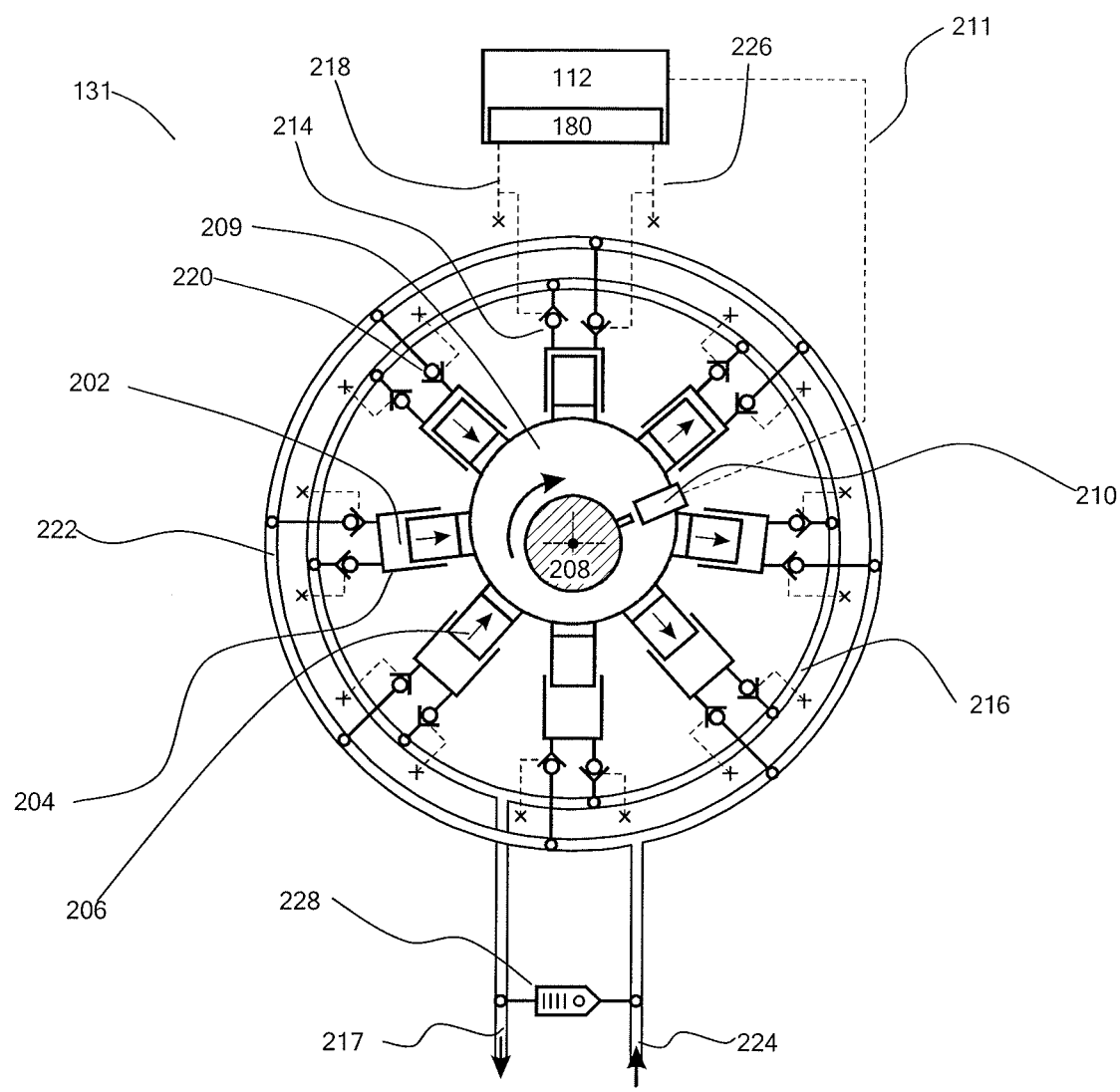
FIG. 2 shows a hydraulic motor for use in the wind turbine generator of FIG. 1.

FIG. 2 illustrates the hydraulic motor (131) in the form of a electronically commutated hydraulic pump/motor comprising a plurality of working chambers (202, designated individually by letters A to H) which have volumes defined by the interior surfaces of cylinders (204) and pistons (206) which are driven from a rotatable shaft (208) by an eccentric cam (209) and which reciprocate within the cylinders to cyclically vary the volume of the working chambers. The rotatable shaft is firmly connected to and rotates with the generator shaft (159). The hydraulic motor may comprise a plurality of axially-spaced banks of working chambers driven from the same shaft by similarly spaced eccentric cams. A shaft position and speed sensor (210) determines the instantaneous angular position and speed of rotation of the shaft, and through signal line (211, being some of the motor actuation and motor shaft signals 173) informs the controller (112), which enables the controller to determine the instantaneous phase of the cycles of each working chamber. The controller is typically a microprocessor or microcontroller, which executes a stored program in use. The controller can take the form of a plurality of microprocessors or microcontrollers which may be distributed and which individually carry out a subset of the overall function of the controller.

The working chambers are each associated with Low Pressure Valves (LPVs) in the form of electronically actuated face-sealing poppet valves (214), which face inwards toward their associated working chamber and are operable to selectively seal off a channel extending from the working chamber to a low pressure conduit (216), which functions generally as a net source or sink of fluid in use and may connect one or several working chambers, or indeed all as is shown here, to a low pressure port (217) which is fluidically connected to the low pressure manifold (135) of the WTG. The LPVs are normally open solenoid closed valves which open passively when the pressure within the working chamber is less than or equal to the pressure within the low pressure manifold, i.e. during an intake stroke, to bring the working chamber into fluid communication with the low pressure manifold, but are selectively closable under the active control of the controller via LPV control lines (218, being some of the motor actuation and motor shaft signals 173) to bring the working chamber out of fluid communication with the low pressure manifold. Alternative electronically controllable valves may be employed, such as normally closed solenoid opened valves.

The working chambers are each further associated with High Pressure Valves (HPVs) (220) in the form of pressure actuated delivery valves. The HPVs open outwards from the working chambers and are operable to seal off a channel extending from the working chamber to a high pressure conduit (222), which functions as a net source or sink of fluid in use and may connect one or several working chambers, or indeed all as is shown here, to a high pressure port (224, acting as the inlet of the hydraulic motor) which is in fluid communication with the high pressure manifold (133). The HPVs function as normally-closed pressure-opening check valves which open passively when the pressure within the working chamber exceeds the pressure within the high pressure manifold. The HPVs also function as normally-closed solenoid opened check valves which the controller may selectively hold open via HPV control lines (226, being some of the motor actuation and motor shaft signals 173) once that HPV is opened by pressure within the associated working chamber. Typically the HPV is not openable by the controller against pressure in the high pressure manifold. The HPV may additionally be openable under the control of the controller when there is pressure in the high pressure manifold but not in the working chamber, or may be partially openable, for example if the valve is of the type and is operated according to the method disclosed in WO 2008/029073 or WO 2010/029358.

In a normal mode of operation described in, for example, EP 0 361 927, EP 0 494 236, and EP 1 537 333, the contents of which are hereby incorporated herein by way of this reference, the controller selects the net rate of displacement of fluid from the high pressure manifold by the hydraulic motor by actively closing one or more of the LPVs shortly before the point of minimum volume in the associated working chamber's cycle, closing the path to the low pressure manifold which causes the fluid in the working chamber to be compressed by the remainder of the contraction stroke. The associated HPV opens when the pressure across it equalises and a small amount of fluid is directed out through the associated HPV. The controller then actively holds open the associated HPV, typically until near the maximum volume in the associated working chamber's cycle, admitting fluid from the high pressure manifold and applying a torque to the rotatable shaft. In an optional pumping mode the controller selects the net rate of displacement of fluid to the high pressure manifold by the hydraulic motor by actively closing one or more of the LPVs typically near the point of maximum volume in the associated working chamber's cycle, closing the path to the low pressure manifold and thereby directing fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement. As well as determining whether or not to close or hold open the LPVs on a cycle by cycle basis, the controller is operable to vary the precise phasing of the closure of the HPVs with respect to the varying working chamber volume and thereby to select the net rate of displacement of fluid from the high pressure to the low pressure manifold or vice versa.

Arrows on the ports (217,224) indicate fluid flow in the motoring mode; in the pumping mode the flow is reversed. A pressure relief valve (228) may protect the hydraulic motor from damage.

Figure 3:
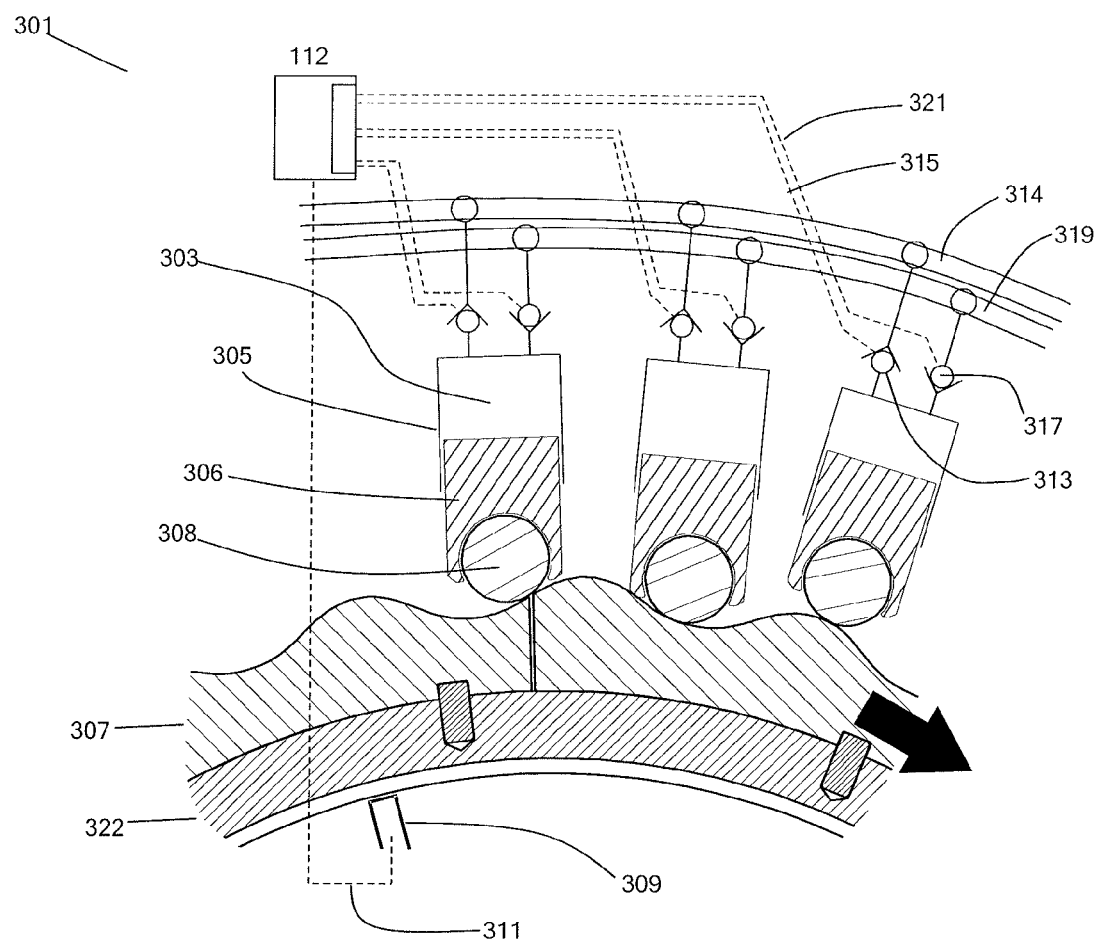
FIG. 3 shows a section of a pump for use in the wind turbine generator of FIG. 1.

FIG. 3 illustrates in schematic form a portion (301) of the pump (129) with electronically commutated valves. The pump consists of a number of similar working chambers (303) in a radial arrangement, of which only three are shown in the portion in FIG. 3. Each working chamber has a volume defined by the interior surface of a cylinder (305) and a piston (306), which is driven from a ring cam (307) by way of a roller (308), and which reciprocates within the cylinder to cyclically vary the volume of the working chamber. The ring cam may be broken into segments mounted on the shaft (322), which is firmly connected to the rotor shaft (125). There may be more than one bank of radially arranged working chambers, arranged axially along the shaft. Fluid pressure within the low pressure manifold, and thus the working chambers, greater than the pressure surrounding the ring cam, or alternatively a spring (not shown), keeps the roller in contact with the ring cam. A shaft position and speed sensor (309) determines the instantaneous angular position and speed of rotation of the shaft, and informs a controller (112), by way of electrical connection (311, being some of the pump actuation and pump shaft signals 171), which enables the controller to determine the instantaneous phase of the cycles of each individual working chamber. The controller is typically a microprocessor or microcontroller, which executes a stored program in use. The controller can take the form of a plurality of microprocessors or microcontrollers which may be distributed and which individually carry out a subset of the overall function of the controller.

Each working chamber comprises a low pressure valve (LPV) in the form of an electronically actuated face-sealing poppet valve (313) which faces inwards toward the working chamber and is operable to selectively seal off a channel extending from the working chamber to a low pressure conduit (314), which functions generally (in the pumping mode) as a net source of fluid in use (or sink in the case of motoring). The low pressure conduit is fluidically connected to the low pressure manifold (135). The LPV is a normally open solenoid closed valve which opens passively when the pressure within the working chamber is less than the pressure within the low pressure conduit, during an intake stroke, to bring the working chamber into fluid communication with the low pressure manifold, but is selectively closable under the active control of the controller via an electrical LPV control signal (315, being some of the pump actuation and pump shaft signals 171) to bring the working chamber out of fluid communication with the low pressure manifold. Alternative electronically controllable valves may be employed, such as normally closed solenoid opened valves.

The working chamber further comprises a high pressure valve (HPV, 317) in the form of a pressure actuated delivery valve. The HPV faces outwards from the working chamber and is operable to seal off a channel extending from the working chamber to a high pressure conduit (319), which functions as a net source or sink of fluid in use and is in fluid communication with the high pressure manifold (133). The HPV functions as a normally-closed pressuring-opening check valve which opens passively when the pressure within the working chamber exceeds the pressure within the high pressure manifold. The HPV may also function as a normally-closed solenoid opened check valve which the controller may selectively hold open via an HPV control signal (321, being some of the pump actuation and pump shaft signals 171) and once the HPV is opened, by pressure within the working chamber. The HPV may be openable under the control of the controller when there is pressure in the high pressure manifold but not in the working chamber, or may be partially openable.

In a normal mode of operation described in the prior art (for example, EP 0 361 927, EP 0 494 236, and EP 1 537 333), the controller selects the net rate of displacement of fluid to the high pressure manifold by the hydraulic pump by actively closing one or more of the LPVs typically near the point of maximum volume in the associated working chamber's cycle, closing the path to the low pressure manifold and thereby directing fluid out through the associated HPV on the subsequent contraction stroke. The controller selects the number and sequence of LPV closures to produce a flow or apply a torque to the shaft (322) to satisfy a selected net rate of displacement. As well as determining whether or not to close or hold open the LPVs on a cycle by cycle basis, the controller is operable to vary the precise phasing of the closure of the LPVs with respect to the varying working chamber volume and thereby to select the net rate of displacement of fluid from the low pressure manifold to the high pressure manifold.

FIG. 4 shows one time-step of the operation of a control algorithm (400) implementing the invention, and executed within the controller (112).

Figure 4A:
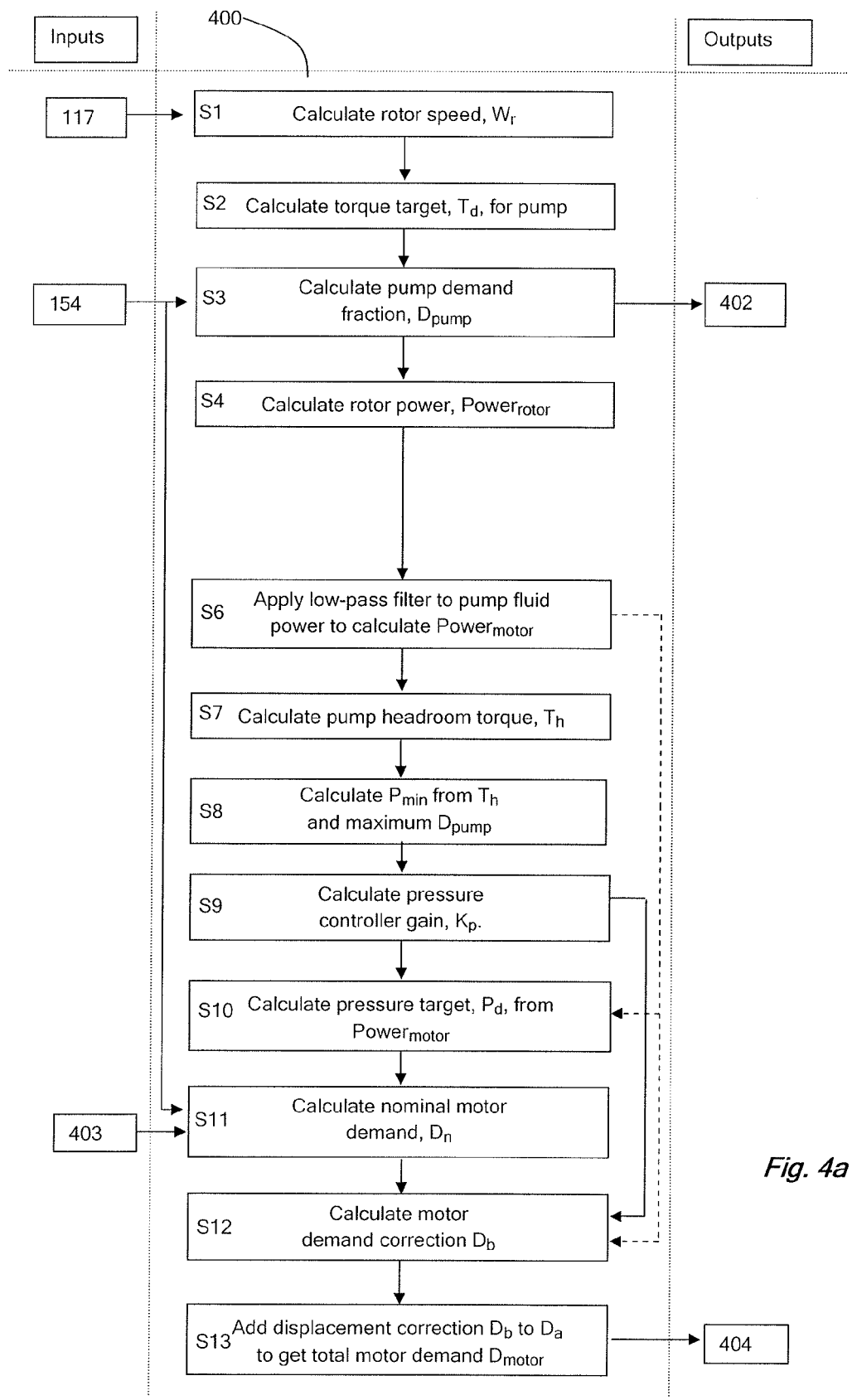
FIG. 4 shows the computational steps for one time-step of an algorithm implementing the invention.

Referring first to FIG. 4a, at step S1 the rotor speed $W_r$ is calculated from the rotor speed signal (117). Alternatively the rotational speed of the pump may be measured as the pump and rotor are directly connected by the rotor shaft. A torque target, $T_d$, is calculated at step S2 from the rotor speed.

Figure 4B:
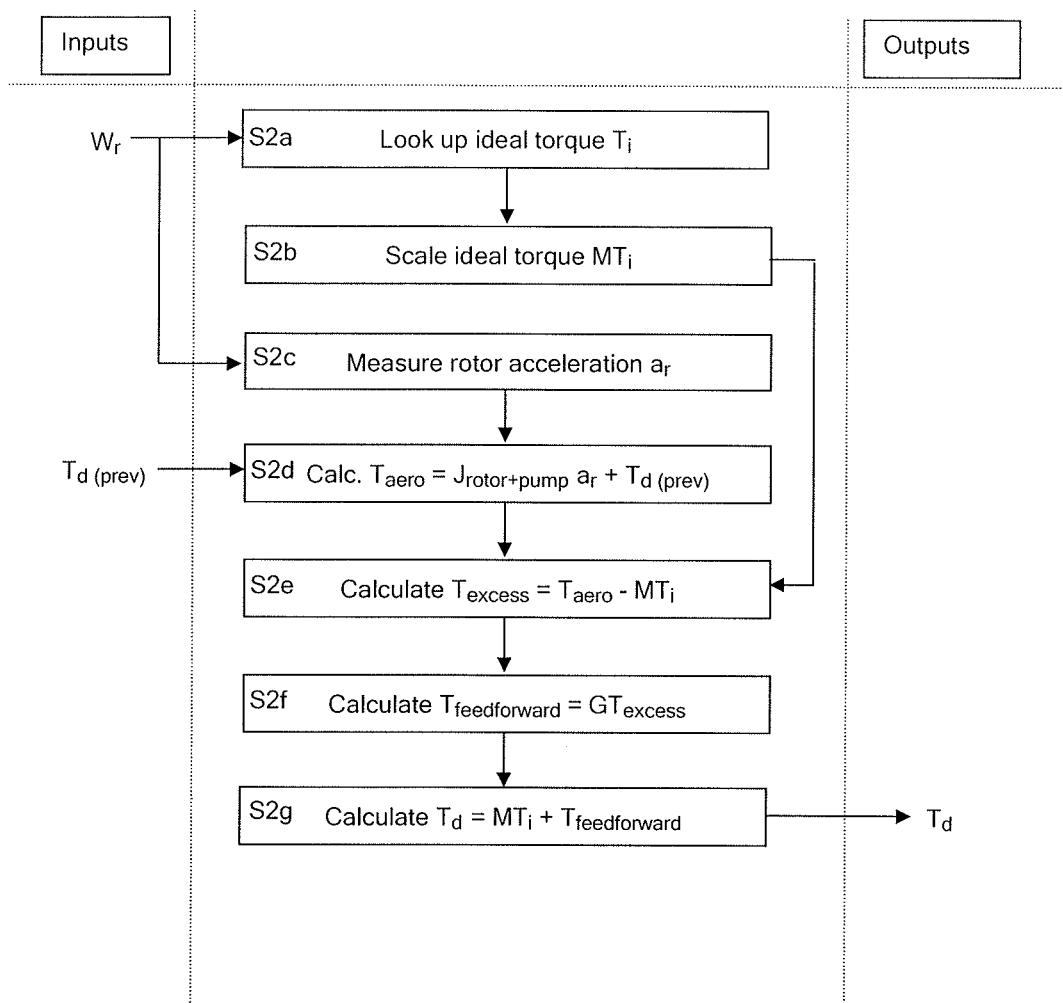

Referring now to FIG. 4b, which shows step S2 in more detail, the aerodynamically ideal rotor torque $T_i$ is found in step S2a from a function of current rotor speed $W_r$ which is described in more detail with reference to FIG. 6. In step S2b, $T_i$ is scaled by an ideal torque scale factor M which would typically be between 0.9 and 1 and may vary during use, according to wind conditions and blade aerodynamic changes over time. M<1 causes the pump to produce a small amount less torque than ideal for the average wind speed, and thereby to run slightly faster than ideal for the average wind speed. The WTG is thus aerodynamically less optimal during lulls (than when M=1), but more optimal during gusts; since the available power is very much higher in gusts than in lulls, the WTG captures more energy overall, albeit with a more variable capture rate.

The algorithm also has the ability to adjust the torque applied to the rotor by the pump to cause the rotor to more closely follow rapid changes in wind speed and thereby extract maximum power from the wind even during gusts and lulls. In step S2c the rotor acceleration $a_r$ is determined from the rate of change of the speed $W_r$. In step Std the aerodynamic torque $T_{aero}$ (the actual amount of torque applied to the rotor by the wind at the present time) is discovered, being the sum of the torque applied to the rotor by the pump in the previous timestep $T_{d\ (prev)}$ (known from the selected net displacement rate of the pump and the measured pressure in the high pressure manifold) and the net torque that is accelerating the combined inertia of the rotor, pump and rotor shaft $J_{rotor+pump}$. In step S2e the algorithm computes the excess torque $T_{excess}$ over and above the pump torque, i.e. that torque which is expected to accelerate (if positive) or decelerate (if negative) the rotor, rotor shaft and pump. Step S2f comprises multiplying $T_{excess}$ by G, a feedforward gain, to calculate $T_{feedforward}$. A more complex feedforward function could be used, for example a lead or lag controller, to improve tracking of wind speed even further.) In step S2g, $T_{feedforward}$ is added to the ideal torque for maximum power capture $T_i$, to find the torque demand $T_d$ that should be applied to the rotor by the pump to allow the rotor speed to track the wind speed accurately, while extracting maximum power when the rotor and wind speeds are matched by the optimum tip speed ratio.

Returning to FIG. 4a, at step S3 $T_d$ is divided by the measured pressure of the high pressure manifold (from the HP pressure signal, 154) to calculate a pump demand $D_{pump}$. The pump demand is the selected net rate of displacement of the pump and is an output (402) of the control algorithm, used by the controller to selectively operate the LPVs (and possibly HPVs) of the pump in the manner described above.

At step S4, the controller calculates the power in the fluctuating energy flow Power$_{rotor}$. This can be done in a number of different ways, for example: using the known rotation rate of the pump, the selected net rate of displacement of the pump, and the pressure in the high pressure manifold to calculate the hydraulic power output; or using the known rotation rate of the rotor and the estimated aerodynamic torque $T_{aero}$ to calculate the mechanical power output.

A smoothed version of the fluctuating energy flow, Power$_{motor}$, is calculated at step S6, by executing a smoothing module, for example a first order low pass filter, on Power$_{rotor}$. The designer may choose the smoothing algorithm to suit the WTG and the conditions. The smoothed version forms the basis of calculating the net rate of displacement of working fluid by the hydraulic motor, and is selected without regard to the effect of that rate on the pressure within the high pressure manifold, i.e. independently of it.

A headroom torque, $T_h$, is calculated at step S7. The headroom torque defines the minimum torque the pump must be able to apply to the rotor shaft at 'short notice' to properly control the rotor speed during unexpected gusts or wind increases. (The headroom torque is a function of the rotational speed of the pump and its properties will be described in detail later with reference to FIG. 6.)

Rotor torque is the product of the pump selected net rate of displacement per revolution (which has a design limit fixed by the number of working chambers and their volume) and high pressure manifold pressure, so the torque headroom requirement provides a lower limit to $P_{min}$. A minimum pressure of the high pressure manifold, $P_{min}$, is calculated from $T_h$ in step S8, and defines the lower limit of the acceptable pressure range. In addition the minimum precharge pressure $P_{acc,min}$ of the smoothing (or first and second accumulators) provides an additional lower limit to $P_{min}$ below which there may be insufficient compliance in the high pressure manifold to achieve desirable operation. $P_{min}$, and thus the acceptable pressure range, must be above both lower limits.

Figure 7:
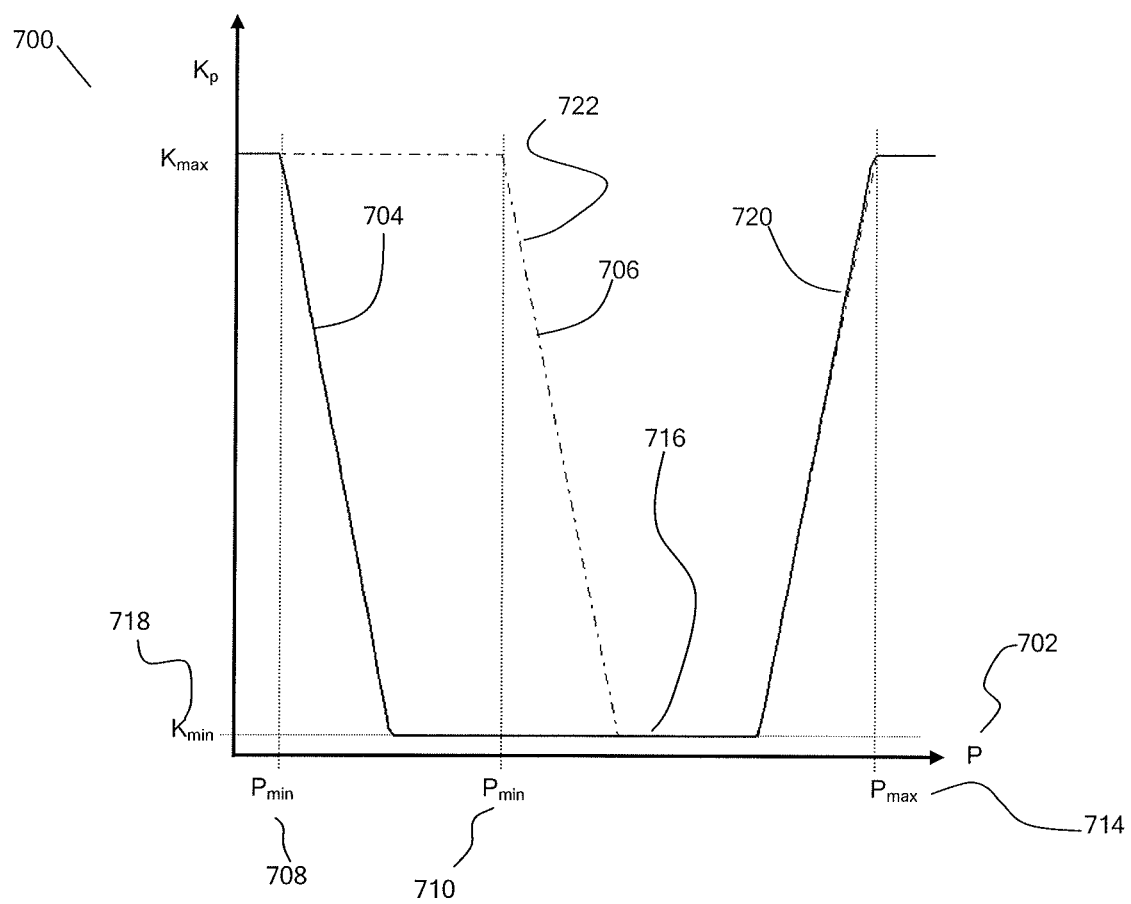
FIG. 7 shows a particularly favourable gain function.

The minimum pressure of the high pressure manifold $P_{min}$, the design maximum pressure of said manifold $P_{max}$ (acting as an upper limit of the acceptable pressure range), and either the fluctuating energy flow or the smoothed version thereof, are used in step S9 to calculate a pressure controller gain, $K_p$, according to the function described with respect to FIG. 7.

Figure 8:
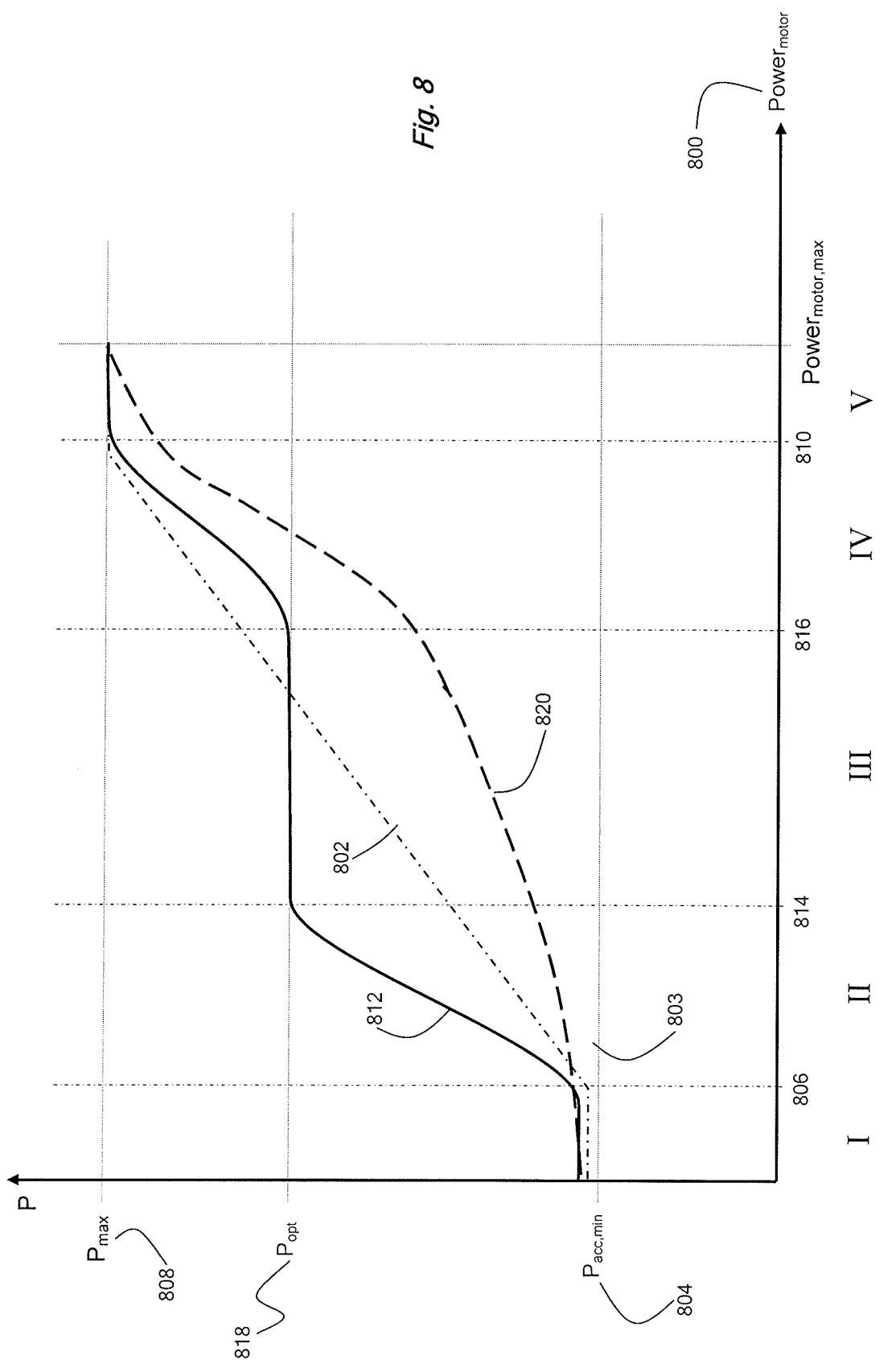
FIG. 8 shows some alternative target pressure functions.

In step S10 a target pressure, $P_d$, is calculated from one or more of the optimum operating points of the WTG, the operating range limits of the WTG or a minimum pressure requirement, according to the function described with respect to FIG. 8.

The algorithm calculates a nominal value for the net rate of displacement of the motor (motor demand), $D_n$, at step S11. The nominal motor demand is calculated from the motor speed signal 211, the HP pressure signal (154) and Power$_{motor}$ ($D_n$=Power$_{motor}$/$W_{motor}$/$P_s$).

At step S12 the algorithm calculates a motor demand correction, $D_b$, by multiplying the difference between the measured pressure and the target pressure $P_d$ by the pressure controller gain $K_p$.

The final step of the algorithm, S13, calculates the net rate of displacement of the motor (motor demand), $D_{motor}$, by adding together the nominal motor demand $D_n$ and the demand correction $D_b$. The motor demand is an output of the control algorithm (404), used by the controller to selectively operate the valves of the motor in the manner described above.

The algorithm is executed repeatedly in use.

An example of the operation of the invention in controlling the WTG of FIG. 1, when the WTG is subjected to a wind gust, will now be described.

Before the WTG is affected by the gust, the rotor is spinning at near to the aerodynamic optimum speed. (If M is for example 0.97, the rotor spins a little faster than the aerodynamic optimum, so will already be running a little fast to thereby capture the impending and other gusts more efficiently.) The high pressure manifold pressure $P_s$ is equal to the optimal desired pressure $P_d$ (acting as the target pressure) determined with reference to the steady wind power and other conditions.

When the gust impinges on the WTG the rotor will accelerate due to the gust increasing the torque applied to the hub above the torque applied by the pump $T_d$ at the previous timestep. The controller calculates this acceleration $a_r$ of the rotor according to step S2c, and from that estimates the aerodynamic torque $T_{aero}$ from the wind according to step S2d. Using steps S2e, S2f and S2g, the controller calculates the required pump torque $T_d$. If gain G is, for example around 0.3, then due to the subtraction of $T_{feedforward}$ from $MT_i$, the pump demand $T_d$ is reduced. $D_{pump}$ falls (step S3), meaning less fluid is displaced by the pump and less torque is applied than in the absence of the gust. The rotor will thus accelerate faster than if G=0, and thereby quickly match the tip speed to the wind speed (in the constant tip speed ratio range) to extract maximum power from the gust.

The controller calculates the fluctuating energy flow Power$_{rotor}$ (step S4) from the ideal rotor torque $MT_i$ (or the estimated aerodynamic torque $T_{aero}$) and current rotor speed. Power$_{motor}$ is calculated by filtering the result of the addition with the low pass filter as described earlier with reference to step S6. The low pass filter means that immediately after the gust affects the WTG, and in contrast to WTGs of the prior art, the motor power (and thus the generator's electrical output) is substantially the same as immediately before the gust, despite the increase in wind power and the decrease in pump output.

Because the transfer of fluid into the high pressure manifold has fallen, fluid is extracted from the first and second accumulators to help drive the motor. The high pressure manifold pressure $P_s$ falls as fluid is extracted, and in subsequent timesteps $D_{pump}$ will rise to maintain the desired pump torque demand $T_d$ as $P_s$ falls below the optimal pressure $P_d$. The smoothly changing pump torque demand increases the lifetime of the blades or allows them to be made more cheaply.

In a short time the rotor speed will have increased to match the wind speed. The pump demand $T_d$ will now match the ideal torque $MT_i$ and the pump will be extracting the full power of the gust. Because the low pass filter causes Power$_{motor}$ to increase more slowly, excess fluid will be transferred by the pump and stored in the first and second accumulators, raising pressure $P_s$. Typically $P_s$ will rise beyond the optimal pressure $P_d$. $P_s$ is therefore substantially unregulated within this first pressure range.

When the gust ebbs, the reverse process happens. The controller detects rotor deceleration, increases the pump torque to slow the rotor to match the new wind speed, and in the process additional energy is stored in the accumulators and pressure $P_s$ rises further. The controller's low pass filter causes Power$_{motor}$ to decrease slowly after the gust ebbs, extracting fluid from the and accumulators returning pressure $P_s$ towards the optimum pressure $P_d$. If there is any remaining discrepancy between $P_s$ and $P_d$, the pressure controller 529 will adjust the motor demand $D_{motor}$ up or down slightly to ensure their eventual convergence.

It may be that when the gust impinges on the WTG, the pressure $P_s$ falls so far that it enters the lower second range adjacent to the lower limit of the acceptable pressure range at $P_{min}$. In this case the pressure feedback controller gain $K_p$ will rise and the pressure feedback controller 529 will provide a stronger correction $D_b$ to reduce the motor demand $D_{motor}$ and thereby avoid $P_s$ reaching $P_{min}$. The electrical output of the generator will decrease, but damage to the turbine is avoided.

It may also be that after the gust impinges on the WTG, or when the gust passes, the pressure $P_s$ rises so far that it enters the upper second range near the upper limit of the acceptable pressure range at $P_{max}$. In this case the pressure feedback controller gain $K_p$ will rise and the pressure feedback controller 529 will provide a stronger correction $D_b$ to increase the motor demand $D_{motor}$ and thereby avoid $P_s$ reaching $P_{max}$. The electrical output of the generator will increase, but damage to the turbine is avoided.

The result is a much more smooth generation of electricity than the WTGs of the prior art. The accumulators enable the output power of the WTG to be a time-averaged version of the instantaneous input power to the blades.

The time constant of the low pass filter is related to the size of the hydraulic accumulators and the pump and the wind conditions at the site of the WTG's installation. The time constant is preferably chosen just long enough that the pressure does not extravagate the first range consequent to 90% of gusts or lulls, or for at least 95% of the operating time for example. The low pass filter behaviour may be adjusted in use according to changing wind conditions, acting as characteristics of the fluctuating enegy flow. It is preferable that when the expected energy of a gust or lull increases (for example, at high wind speeds or when the wind is from a direction associated with gusty conditions), the low pass filter's action is reduced so that the hydraulic motor responds more quickly to the gust and the high pressure manifold pressure does not rise too high. The controller may employ algorithms to learn the optimum filter parameters that provide the smallest variations in generator power output while keeping the pressure within the first range. The controller may determine a set of optimum filter parameters that are just long enough that the pressure does not extravagate the first pressure range consequent to 90% of gusts or lulls, or for at least 95% of the operating time for example.

Figure 5:
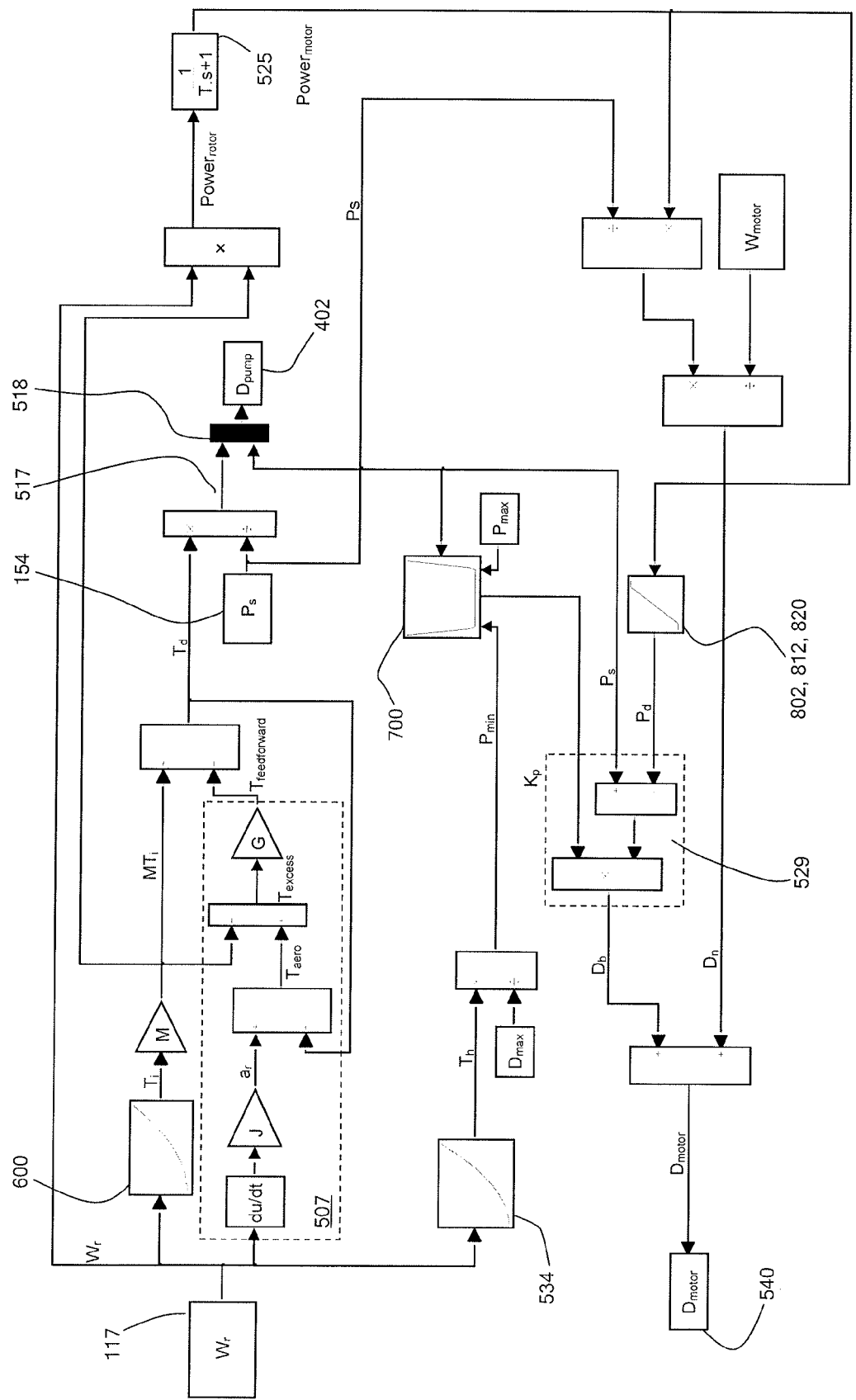
FIG. 5 is a schematic the signal flow in a controller implementing the invention.

FIG. 5 shows a schematic of the signal flows in the implementation of the invention, equivalent to the execution flow diagram in FIG. 4. The rotor speed measurement (117) is used to calculate the ideal torque $T_i$ according to the function (600) defined with reference to FIG. 6. The ideal torque is adjusted by multiplying by an ideal torque scale factor M to give an adjusted ideal torque ($MT_i$). The ideal torque scale factor M can be any number between zero and one, and would typically be between 0.9 and 1. A slight reduction in pump torque allows the rotor to accelerate more rapidly during gusts, thus capturing more power than if the pump torque were not scaled from the ideal torque function (600). The scale factor will cause the rotor to decelerate more slowly, thus operating off its optimum operating point during lulls, however the additional power available due to tracking gusts is more significant than power loss due to sub-optimal operation during lulls.

The torque target $T_d$ is the difference between the adjusted ideal torque and the output of a torque feedback controller (507). The torque feedback controller calculates an estimated aerodynamic torque, $T_{aero}$, which is the sum of the current torque target and an acceleration torque which is derived from the angular acceleration of the rotor $a_r$ multiplied by the moment of rotational inertia of the energy extraction device, J. The output of the torque feedback controller is the difference $T_{excess}$ between the estimated aerodynamic torque and the adjusted ideal torque, which is then multiplied by a feedback gain, G to obtain a feedback torque $T_{feedback}$. The feedback gain can be any number greater than or equal to zero, with a value of zero acting to disable the torque feedback controller. The torque feedback controller (507) will respond to the acceleration and deceleration of the energy extraction device by subtracting torque from the adjusted ideal torque $MT_i$ to slightly reduce the torque target $T_d$ in the case of acceleration, and adding torque to the adjusted ideal torque to slightly increase the torque target $T_d$ in the case of deceleration. This enables the rotor to accelerate and decelerate faster in response to changes in input energy than adjusted ideal torque control alone, hence allowing for greater total energy capture.

The pump demand estimate (517) is calculated by dividing the torque target by the measured pressure of the pressurised hydraulic fluid ($P_s$, 154). The pump demand estimate may be modified by a pressure limiter (518), which could be a PID type controller, the output of which is the pump demand output of the controller $D_{pump}$ (402). The pressure limiter acts to keep the pressure within the acceptable range, i.e. below a maximum level for safe operation of the WTG, by modifying the pump demanded rate of fluid quanta transfer. The pressure limit may be disabled in some operating modes wherein it is desirable to dissipate energy through the high pressure relief valve (155), for instance to prevent the turbine from operating above its rated speed during extreme gusts, or may be varied in use.

From the product of rotor speed $W_r$ and adjusted ideal torque $MT_i$ the controller calculates the fluctuating energy flow $Power_{rotor}$. (Alternatively this could be calculated from hydraulic information available to the controller: the rotation rate of the pump, the selected net rate of displacement of the pump, and the pressure in the high pressure manifold.)

A smoothing module (525) in the form of a first order low pass filter smooths $Power_{rotor}$ to provide the motor throughput power $Power_{motor}$. $Power_{motor}$ is divided by the measured hydraulic motor speed $W_{motor}$ and pressure of the pressurised hydraulic fluid $P_s$ to find the nominal motor demand $D_n$.

The motor throughput power informs a target pressure function (802, 812, 820) which provides a target pressure $P_d$ for the pressure feedback controller (529), which in turn uses a proportional gain $K_p$ to calculate a motor demand correction $D_b$. $K_p$ is calculated based on where the current pressure $P_s$ lies within the acceptable pressure range (defined by maximum pressure $P_{max}$ of the high pressure manifold, and the minimum pressure $P_{min}$) and within the first and second ranges, according to a gain schedule function (700) described in more detail with reference to FIG. 7. The minimum pressure is calculated by dividing the headroom torque $T_h$, which is a function (534) of rotor speed, by the maximum pump demand $D_{max}$. The headroom torque function is described in more detail with reference to FIG. 6. The output hydraulic motor demand $D_{motor}$ (540) is the sum of the nominal motor demand $D_n$ and the motor demand correction $D_b$.

The invention has been shown with a proportional controller for the pressure feedback controller (529) and a first order low pass filter for the smoothing module (525). It is also possible to make alternative embodiments. For example, the pressure feedback controller could be a proportional-integral controller (PI controller) with a low integral gain and the smoothing module and nominal motor demand $D_n$ may be removed altogether. Whereas generally a proportional-integral controller is selected from a set of candidate controllers in order to enhance the tracking of an output to an input, surprisingly we have found that if the integral gain is low enough then the controller acts to smooth the fluctuating energy flow to created a smoothed motor demand correction $D_b$.

Figure 6:
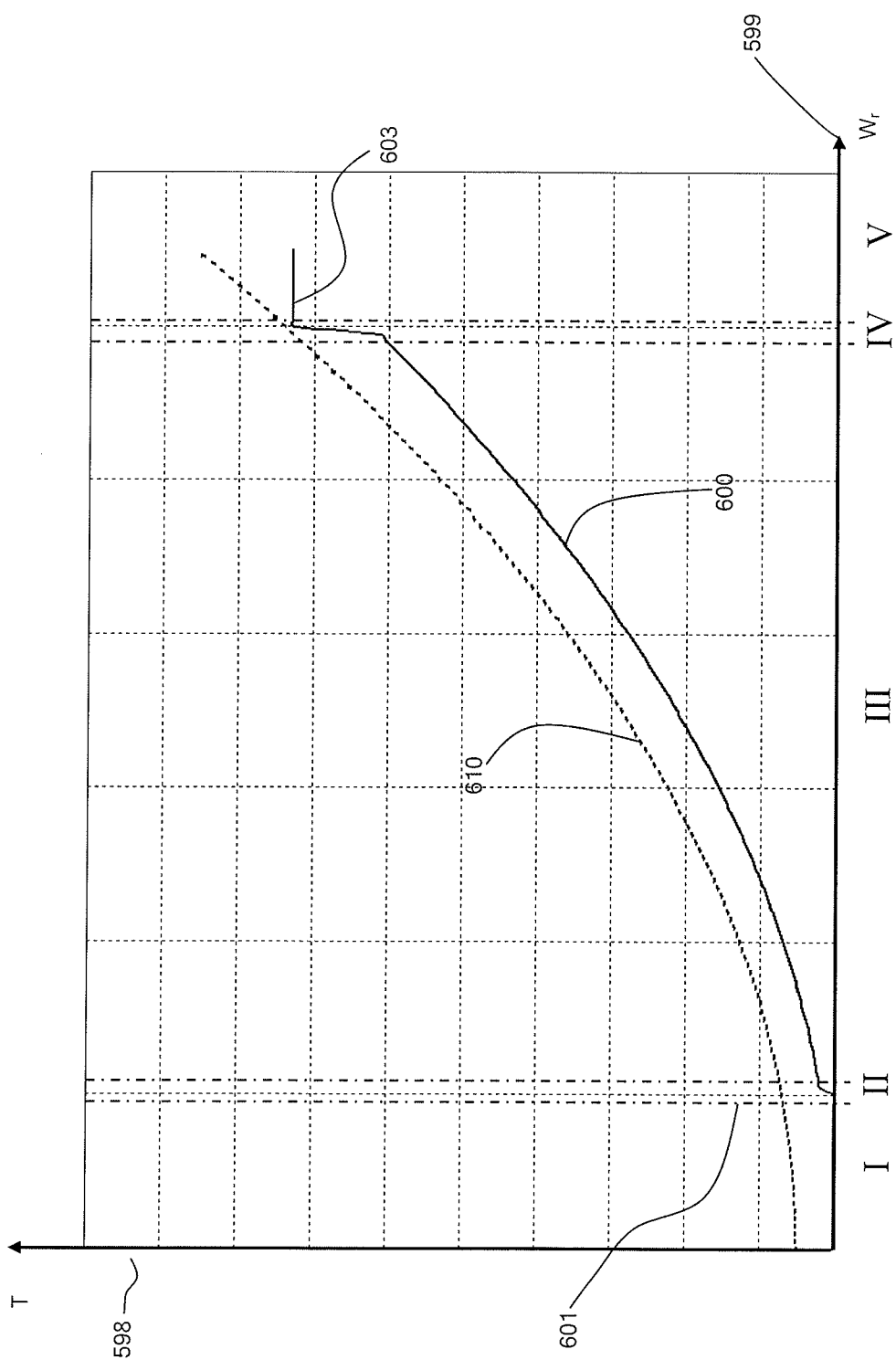
FIG. 6 shows a particularly favourable relationship between torque and speed.

FIG. 6 shows the aerodynamically ideal rotor torque (T, 598) as a function (600) of rotor speed ($w_r$, 599), which is used in step S2a to determine the ideal torque $T_i$ according to which the pump regulates the torque it applies to the rotor. When the wind speed rises to a cut-in speed where the WTG should begin to operate, the controller unfeathers the blades by appropriate pitch actuation signals (121) to the pitch actuators (119), and releases any mechanical brakes. Below a minimum speed (601, i.e. section I in FIG. 6) the ideal torque is substantially zero and the turbine accelerates up to the minimum speed without the pump applying any torque. In section II the increasing torque profile causes the controller to command the pump to apply an increasing force to stabilise the turbine speed. It is well known that the optimum torque for a WTG with fixed blade pitch is a function of the wind or rotor speed squared. In section III (corresponding to constant tip speed ratio range) the ideal torque curve follows this optimum profile and the controller pitches the blades to their (constant) optimum aerodynamic pitch by appropriate pitch actuation signals to the pitch actuators. In section IV, where the turbine is near its maximum operating speed, the torque curve becomes a steep linear function up to the torque of the source at the maximum pressure (the rated torque). The purpose of section IV is to limit the speed of the turbine, by ramping up the torque to its maximum value (603) over essentially a constant speed. By section V the source has reached its maximum torque output, and the turbine is at its maximum speed. In this region the controller actively controls the turbine speed by appropriate pitch actuation signals to the pitch actuators, and the pump is providing a constant (maximum) output torque.

The headroom torque curve (610) is shown on the Figure as a dashed line. The headroom torque is shown as a quadratic function with, in section III, a constant offset from the optimum turbine torque, but may be another function which could even depend on other variables than the rotor speed. The application of this curve to the invention and the calculation of $P_{min}$ are described with reference to FIG. 4. The headroom torque curve may be adjusted during use according to changing wind conditions, for example expectations about the energy of gusts or lulls, based on experienced historical or current conditions.

FIG. 7 shows a typical pressure feedback controller gain $K_p$ (700) as a function of pressure P (702). The parameter $P_{min}$ varies as just described with rotor speed, so FIG. 7 shows a characteristic $K_p$ function at low speed (704) and a characteristic $K_p$ function at high speed (706). In this way the acceptable pressure range (defined by the range $P_{min}$ to $P_{max}$) varies with the current rotation rate of the rotating shaft.

When the pressure of the hydraulic fluid is below $P_{min}$ (708, 710), the controller gain is set at the maximum gain $K_{max}$ (712). Above the maximum pressure in the high pressure manifold $P_{max}$ (714), $K_p$ is also high, in this example also $K_{max}$ although any other high gain value may be chosen. Thus when the pressure is outside the allowable range, the motor net rate of displacement $D_{motor}$ is strongly controlled to bring the pressure within the allowable range.

Over a first range (716) lying between $P_{min}$ and $P_{max}$ but not extending to either, the controller gain is constant at $K_{min}$ (718) which is non-zero but low enough that the pressure is substantially unregulated. This has the benefit that when the pressure is within the first range the pressure can vary widely to absorb energy into or extract energy from the first and second accumulators, while still tending to converge on the target pressure, in other words the net rate of displacement of working fluid by the motor is selected independently of the pressure within the high pressure manifold. In upper (720) and lower (722) portions of a second range, $K_p$ increases linearly from $K_{min}$ to $K_{max}$. Thus the strength of pressure regulation increases progressively as the pressure approaches the limits $P_{min}$ or $P_{max}$, i.e. moves further into the second ranges. This has the benefit of reducing the likelihood that the pressure will reach either of those limits in use as the motor net rate of displacement $D_{motor}$ is more strongly controlled to maintain the pressure within the allowable range.

FIG. 8 shows examples of the types of target pressure functions that could be implemented by the invention. The target pressure functions define a target pressure (528) for the pressure feedback controller (529) that is a function of the fluctuating energy flow Power$_{rotor}$ or the low-pass filtered version Power$_{motor}$ (800), with the shape of the function being determined from a wide range of variables as will be explained.

The dot-dashed line (802) shows a first target pressure function wherein the target pressure is equal to or just larger than the constant minimum pressure $P_{acc,min}$ (804) in a first region (I) spanning from zero power to a first power (806), is equal to the constant maximum pressure $P_{max}$ (808) in a fifth region (V) spanning from a fourth power (810) to the maximum rated power Power$_{motor,max}$, and increases linearly with Power$_{motor}$ between the first region and the fifth region.

The minimum precharge pressure $P_{acc,min}$ is a lower limit to pressure below which there is insufficient compliance fluidically connected to the high pressure manifold, i.e. below the precharge pressure of the smoothing or first or second accumulators. The maximum pressure $P_{max}$ is related to the maximum allowable operating pressure of the pressurised hydraulic fluid, considering component lifetimes and the setting of the high pressure relief valve (155). Thus the target pressure is responsive to characteristics of the fluctuating energy flow, the hydraulic pump and motor, and the accumulators.

The first target pressure function provides the benefit of ensuring that there is enough pressure for the pump to apply maximum torque to the rotor at high power conditions (i.e. in the fifth region V). The first target pressure function further provides the benefit of ensuring that in the first region (I) in which the kinetic energy in the rotor is low, the pressure is maintained low enough that the relative energy absorbed by individual working chamber activations of the pump is not sufficient to apply too much torque to the blades or other parts of the WTG, while still being above the minimum allowable pressure $P_{min}$.

A second target pressure function is shown with a solid line (812). This function is similar to the first target pressure function in regions I and V, but further comprises a third region (III) spanning from a second power (814) to a third power (816) in which the target pressure is an optimum pressure $P_{opt}$ (818), and second (II) and fourth regions (IV) spanning from the first to the second powers and from the third to the fourth powers respectively, which provide for a smooth change in target pressure between the adjacent regions.

Optimum pressure $P_{opt}$ is a pressure at which the pump and the motor (and all the other hydraulic components) together work at optimal hydraulic efficiency. $P_{opt}$ may be found by experiment, simulation or calculation, or any combination thereof. It may be that the pump and/or the motor are designed to be optimally efficient at $P_{opt}$, which may be chosen by the designer. Thus the target pressure is responsive to characteristics of the fluctuating energy flow, the hydraulic pump and the hydraulic motor.

The second target pressure function provides the benefit of ensuring that the WTG transmission operates where possible at an optimal pressure and thus that its energy productivity is maximised.

A third target pressure function is shown with a dashed line (820). This function defines a target pressure that is closer to the minimum system pressure, rather than the maximum, over the majority of the operating power throughput levels of the WTG. The advantage of the third target pressure function is that the accumulators are generally at a low state of charge to maximise the storage available to accept energy from gusts of wind, and also to operate the WTG at high rates of fluid flow, rather than high pressure, which may be desirable to reduce vibration and or noise, or to increase the lifetime of the WTG.

The particular target pressure function that is implemented may change on a second-by-second basis with respect to other parameters, for example, throughput power estimates from an external source, the estimated lifetime and efficiency of components of the WTG, the need to start or stop the WTG or any other desired operating mode of the WTG. For example, when the wind speed is not fluctuating much the controller selects the second target pressure function (812) so that the pressure is typically optimised for hydraulic efficiency, whereas when the wind is gusty the controller selects the third target pressure function (820) so that the first and second accumulators can absorb the energy of the gusts. Thus the target pressure is changed (reduced) in anticipation of energy being received from the fluctuating energy source at a rate which would cause the pressure in the high pressure manifold to exceed a threshold (entering the upper second range (720). In another example, the WTG controller may select the third target pressure function (820) over the second target pressure function (812) responsive to detection of a small leak, because the third target pressure function maintains a lower pressure which will make the leak less severe, and is also less likely to lead to a major failure. The controller may of course blend any of the target pressure functions together to create an infinite number of variations, optimised for any conditions and location.

The controller is also able to control the heat exchanger (144) and can thus regulate the working fluid temperature. The controller sets the working fluid temperature based on the target pressure at the current time, according to an optimisation function which minimises the combined hydraulic energy losses from working fluid leakage (typically between the cylinders and the pistons of the working chambers) and from flow losses (typically through the valves of the pump and motor, and the conduits connecting the pump and motor). Typically the viscosity of the working fluid falls at higher temperatures. Typically the leakage losses increase exponentially at higher operating pressures, and so the controller regulates the working fluid to a lower temperature (i.e. higher fluid viscosity), whereas the flow losses dominate at lower pressures, so the controller regulates the working fluid to a higher temperature (i.e. lower fluid viscosity).

Further modifications and variations falling within the scope of the invention will present themselves to those knowledgeable of the art.

The invention claimed is:

1. A method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and an elastically deformable fluid retaining body, the hydraulic pump and hydraulic motor each comprising a plurality of working chambers of cyclically varying volume and a plurality of valves for regulating a volume of working fluid displaced by each said working chamber between each said working chamber and each said manifold, at least one valve associated with each said working chamber being an electronically controlled valve, said electronically controlled valves being operated to select the volume of working fluid displaced by each said working chamber on each cycle of said working chamber and thereby regulate a net rate of displacement of working fluid by each of the hydraulic pump and the hydraulic motor, the method comprising:

measuring a pressure in the high pressure manifold, selecting the net rate of displacement of working fluid by the hydraulic pump responsive to said measured pressure to regulate a torque applied to said rotating shaft, selecting the net rate of displacement of working fluid by the hydraulic motor to smooth the energy flow to the load, and further selecting the net rate of displacement of working fluid by the hydraulic motor to regulate the pressure in the high pressure manifold to remain within an acceptable pressure range, wherein the acceptable pressure range comprises a first range and one or more second ranges, either higher or lower than the first range, and the pressure within the high pressure manifold is regulated more strongly when the pressure is within the or each second range than in the first range by virtue of the net rate of displacement of working fluid by the hydraulic motor being varied, to change the pressure in the high pressure manifold, responsive to the same magnitude of pressure change in the high pressure manifold, by a larger amount in the or each second range than in the first range.

2. A method according to claim 1, wherein the strength of the pressure regulation increases progressively as the pressure moves further into the or each second range.

3. A method according to claim 1, wherein the pressure within the high pressure manifold is substantially unregulated when the pressure is within the first range.

4. A method according to claim 3, wherein when the pressure within the high pressure manifold is within the first range, the net rate of displacement of working fluid by the motor is selected without regard to the effect of the net rate of displacement of working fluid by the motor on the pressure within the high pressure manifold.

5. A method according to claim 1, wherein the net rate of displacement of working fluid by the hydraulic motor is selected dependent on the pressure within the high pressure manifold and the selected net rate of displacement of working fluid by the hydraulic motor changes by a greater amount for a given change in pressure within the high pressure manifold in the or each second range than in the first range.

6. A method according to claim 1, wherein the pressure in the high pressure manifold is regulated towards a target pressure, or range of pressures.

7. A method according to claim 6, wherein the pressure is regulated towards the target pressure, or target range of pressures, more strongly when the pressure within the high pressure manifold is within the or each second range than within the first range.

8. A method according to claim 6, wherein the target pressure, or range of pressures, is variable.

9. A method according to claim 6, comprising selecting a target pressure or range of pressures within the high pressure manifold responsive to one or more characteristics of the fluctuating energy flow, the hydraulic pump, the hydraulic motor, the elastically deformable fluid retaining body, or the load.

10. A method according to claim 6, wherein the target pressure or range of pressures is changed in anticipation of energy being received from the fluctuating energy source at a rate exceeding a threshold or to cause the pressure within the high pressure manifold to exceed a threshold.

11. A method according to claim 1, wherein the acceptable pressure range is variable.

12. A method according to claim 11, wherein the acceptable pressure range is varied according to a function comprising one or more of the current rotation rate of the rotating shaft, or the characteristics of the fluctuating energy flow.

13. A method according to claim 1 wherein, when the pressure exceeds a threshold, action is taken to reduce the net rate of displacement of working fluid by the hydraulic pump.

14. A method according to claim 13, wherein when the pressure exceeds the threshold, the energy extraction device is controlled to reduce the torque transmitted to the rotating shaft by the renewable energy source.

15. A method according to claim 1, wherein the torque applied to the rotating shaft is regulated according to a function comprising one or more of the current rotation rate of the rotating shaft and the rate of change of the rotation rate of the rotating shaft.

16. A method according to claim 1, wherein the operation of said electronically controlled valves is adjusted to compensate for one or more of compression or leakage of the working fluid or energy losses caused by flow of the working fluid.

17. A method according to claim 1, wherein the hydraulic motor comprises a plurality of hydraulic motors.

18. A method according to claim 1, wherein a smoothing calculation is executed comprising the steps of calculating the energy extracted from the fluctuating energy flow by the energy extraction device, calculating a smoothed version thereof, and selecting the net rate of displacement of working fluid by the hydraulic motor responsive to said smoothed version.

19. An energy extraction device for extracting energy from a fluctuating energy flow from a renewable energy source, the device comprising: a controller, a hydraulic pump driven by a rotating shaft, the rotating shaft driven by a renewable energy source, a hydraulic motor driving a load, at least one low pressure manifold, a high pressure manifold in fluid communication with an outlet of the hydraulic pump, an inlet of the hydraulic motor and an elastically deformable fluid retaining body, a pressure sensor for measuring the pressure in the high pressure manifold, and the hydraulic pump and hydraulic motor each comprising a plurality of working chambers of cyclically varying volume and a plurality of valves for regulating the net displacement of working fluid between each working chamber and each manifold, at least one valve associated with each working chamber being an electronically controlled valve, said electronically controlled valves being controllable by the controller to select the volume of working fluid displaced by each said working chamber on each cycle of working chamber volume and thereby regulate the net rate displacement of working fluid by each of the hydraulic pump and the hydraulic motor, wherein the controller is operable to cause the energy extraction device to operate according to the method of claim 1.

20. A non-transitory computer readable storage medium comprising program code instructions which, when executed by a controller of an energy extraction machine, is configured to cause the energy extraction machine to carry out the method of claim 1.

21. A method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and an elastically deformable fluid retaining body, the hydraulic pump and hydraulic motor each comprising a plurality of working chambers of cyclically varying volume and a plurality of valves for regulating a volume of working fluid displaced by each said working chamber between each said working chamber and each said manifold, at least one valve associated with each said working chamber being an electronically controlled valve, said electronically controlled valves being operated to select the volume of working fluid displaced by each said working chamber on each cycle of said working chamber and thereby regulate a net rate of displacement of working fluid by each of the hydraulic pump and the hydraulic motor, the method comprising:
selecting the net rate of displacement of working fluid by the hydraulic pump to regulate a torque applied by the hydraulic pump to said rotating shaft,
selecting the net rate of displacement of working fluid by the hydraulic motor to smooth a rate of power transmission to the load, the elastically deformable fluid retaining body receiving and outputting working fluid from and to the high pressure manifold as required, and
regulating a pressure in the high pressure manifold to remain within an acceptable pressure range,
wherein the acceptable pressure range comprises a first range and one or more second ranges, either higher or lower than the first range, and
the pressure within the high pressure manifold is regulated more strongly when the pressure is within the or each second range than in the first range by virtue of the net rate of displacement of working fluid by the hydraulic motor being varied, to change the pressure in the high pressure manifold, responsive to the same magnitude of pressure change in the high pressure manifold, by a larger amount in the or each second range than in the first range.

22. A method of operating an energy extraction device to extract energy from a fluctuating energy flow from a renewable energy source, the device comprising: a hydraulic pump driven by a rotating shaft, the rotating shaft driven by a renewable energy source, a hydraulic motor driving a load, at least one low pressure manifold and a high pressure manifold in fluid communication with an outlet of the hydraulic pump, an inlet of the hydraulic motor and an elastically deformable fluid retaining body, the hydraulic pump and hydraulic motor each comprising a plurality of working chambers of cyclically varying volume and a plurality of valves for regulating a volume of working fluid displaced by each said working chamber between each said working chamber and each said manifold, at least one valve associated with each said working chamber being an electronically controlled valve, said electronically controlled valves being operated to select the volume of working fluid displaced by each said working chamber on each cycle of said working chamber and thereby regulate a net rate of displacement of working fluid by each of the hydraulic pump and the hydraulic motor, the method comprising:
measuring a pressure in the high pressure manifold, selecting the net rate of displacement of working fluid by the hydraulic pump responsive to said measured pressure to regulate a torque applied to said rotating shaft, the elastically deformable fluid retaining body receiving and outputting working fluid equivalent to the difference between the fluctuating energy flow and the energy flow through the hydraulic motor from and to the high pressure manifold as required, and
in a first pressure range selecting the net rate of displacement of working fluid by the hydraulic motor responsive to said measured pressure to provide a smoothed energy flow to the load, and
in at least one second pressure range selecting the net rate of displacement of working fluid by the hydraulic motor responsive to said measured pressure to regulate the pressure towards the first pressure range.

* * * * *